(12) United States Patent
Ha et al.

(10) Patent No.: US 11,414,098 B2
(45) Date of Patent: Aug. 16, 2022

(54) CONTROL AUTHORITY TRANSFER APPARATUS AND METHOD OF AUTONOMOUS VEHICLE

(71) Applicant: LG Electronics Inc., Seoul (KR)

(72) Inventors: Daegeun Ha, Seoul (KR); Jaesaek Oh, Seoul (KR); Hansung Lee, Seoul (KR); Soojung Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 16/500,643

(22) PCT Filed: Jan. 11, 2019

(86) PCT No.: PCT/KR2019/000470
§ 371 (c)(1),
(2) Date: Oct. 3, 2019

(87) PCT Pub. No.: WO2020/145442
PCT Pub. Date: Jul. 16, 2020

(65) Prior Publication Data
US 2021/0354720 A1    Nov. 18, 2021

(51) Int. Cl.
*B60W 60/00*    (2020.01)
*B60W 30/18*    (2012.01)

(52) U.S. Cl.
CPC .... *B60W 60/001* (2020.02); *B60W 30/18109* (2013.01); *B60W 2552/53* (2020.02); *B60W 2554/4045* (2020.02)

(58) Field of Classification Search
CPC ........ B60W 60/001; B60W 30/18109; B60W 2552/53; B60W 2554/4045
See application file for complete search history.

(56) References Cited

U.S. PATENT DOCUMENTS

| | | | |
|---|---|---|---|
| 2018/0229674 A1* | 8/2018 | Heinrich | ............. B60R 16/0231 |
| 2019/0011914 A1* | 1/2019 | Park | ..................... G05D 1/0061 |
| 2021/0031807 A1* | 2/2021 | Yamamoto | ........ B60W 60/0053 |
| 2021/0316744 A1* | 10/2021 | Kong | .................... B60W 50/08 |

FOREIGN PATENT DOCUMENTS

JP    2018041238 A  *  3/2018    ............... G08G 1/16

* cited by examiner

*Primary Examiner* — Russell Frejd
*Assistant Examiner* — Brittany Renee Peko
(74) *Attorney, Agent, or Firm* — Fish & Richardson P.C.

(57) ABSTRACT

Disclosed is a control authority transfer apparatus of an autonomous vehicle, including a memory storing data on a plurality of users, and at least one processor setting driving operation priorities based on the data, wherein, in the state in which at least a part of autonomous driving control has failed, upon determining that a main user is in a state of being incapable of performing driving operation, the processor selects a first sub-user among a plurality of sub-users as a driving operation user according to the driving operation priorities, and selects a first device matching the first sub-user as a driving operation device.

10 Claims, 28 Drawing Sheets

PRESET FUNCTION ACTIVATION
UI ACCORDING TO MAP OR
DRIVING ENVIRONMENT

CONTROL AUTHORITY TRANSFER APPARATUS AND METHOD OF AUTONOMOUS VEHICLE

CROSS-REFERENCE TO RELATED APPLICATION

This application is a National Stage application under 35 U.S.C. § 371 of International Application No. PCT/KR2019/000470, filed on Jan. 11, 2019, which is incorporated by reference.

TECHNICAL FIELD

The present invention relates to a control authority transfer apparatus and method of an autonomous vehicle.

BACKGROUND ART

A vehicle is an apparatus that carries a passenger in a direction intended by the passenger. A car is the main example of such a vehicle.

In order to increase the convenience of vehicle users, a vehicle is equipped with various sensors and electronic devices. In particular, an Advanced Driver Assistance System (ADAS) is under active study with the goal of increasing the driving convenience of users. In addition, efforts are being actively made to develop autonomous vehicles.

Even when an autonomous vehicle is traveling in an autonomous driving mode, it is necessary to switch to a manual driving mode depending on the situation. When a sensor, a processor, or a communication device, which constitutes an autonomous driving system, fails, it is impossible to maintain autonomous driving, and the control authority of the autonomous vehicle needs to be transferred to the user. If the user who sits in the seat provided with driving operation devices is in a state of being incapable of performing driving operation at the time of transfer of the control authority, the transfer of the control authority is delayed until the user is in a state of being capable of performing driving operation. If the transfer of the control authority is delayed while a vehicle is traveling, this may lead to a traffic accident. Therefore, there is the need for a solution to this problem.

Disclosure

Technical Problem

Therefore, the present invention has been made in view of the above problems, and it is an object of the present invention to provide a control authority transfer apparatus of an autonomous vehicle that enables the transfer of control authority of the vehicle without delay even when a main user is in a state of being incapable of performing driving operation.

It is another object of the present invention to provide a control authority transfer method of an autonomous vehicle that enables the transfer of control authority of the vehicle without delay even when a main user is in a state of being incapable of performing driving operation.

However, the objects to be accomplished by the invention are not limited to the above-mentioned objects, and other objects not mentioned herein will be clearly understood by those skilled in the art from the following description.

Technical Solution

In accordance with the present invention, the above and other objects can be accomplished by the provision of a control authority transfer apparatus of an autonomous vehicle, including a memory storing data on a plurality of users, and at least one processor setting driving operation priorities based on the data, wherein, in the state in which at least a part of autonomous driving control has failed, upon determining that a main user is in a state of being incapable of performing driving operation, the processor selects a first sub-user among a plurality of sub-users as a driving operation user according to the driving operation priorities, and selects a first device matching the first sub-user as a driving operation device.

According to the embodiment of the present invention, the processor may set the driving operation priorities based on at least one of driving experience data, accident history data, age data, seating position data, or driving history data of each of the plurality of users.

According to the embodiment of the present invention, the first device may be a display device, and upon determining that lateral direction control has failed during autonomous driving control, the processor may perform control such that a driving operation screen including a button for lateral-direction movement within a lane, a button for lateral-direction movement for changing lanes, and a button for lateral-direction movement for rotation is displayed on the display device.

According to the embodiment of the present invention, the first device may be a display device, and upon determining that longitudinal direction control has failed during autonomous driving control, the processor may perform control such that a driving operation screen including an area displaying a driving speed value, a button increasing the driving speed value in stages within a range below a preset speed limit value and a button decreasing the driving speed value in stages is displayed on the display device.

According to the embodiment of the present invention, upon determining that the main user is in a state of being capable of performing driving operation, the processor may select a second device matching the main user as a driving operation device.

Details of other embodiments are included in the detailed description and the accompanying drawings.

Advantageous Effects

According to the present invention, there are one or more effects as follows.

First, since a higher-ranked user among sub-users is selected, the probability of occurrence of a traffic accident due to inexperienced driving during a manual driving mode may be lowered.

Second, since driving operation is capable of being realized from any one of the seats in a cabin, control authority of an autonomous vehicle may be transferred to a selected sub-user without delay.

Third, since only user input related to failed control is received through a display device, a minimum level of safety may be ensured even when control authority of an autonomous vehicle is transferred to a user who is inexperienced in driving operation.

However, the effects achievable through the invention are not limited to the above-mentioned effects, and other effects not mentioned herein will be clearly understood by those skilled in the art from the appended claims.

BEST MODE

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

The vehicle described in this specification may include an automobile and a motorcycle. Hereinafter, description will be given mainly focusing on an automobile.

The vehicle described in this specification may be any of an internal combustion vehicle equipped with an engine as a power source, a hybrid vehicle equipped with an engine and an electric motor as power sources, an electric vehicle equipped with an electric motor as a power source, and the like.

In the description below, the left side of the vehicle means the left side with respect to the travel direction of the vehicle and the right side of the vehicle means the right side with respect to the travel direction of the vehicle.

Figure 1:
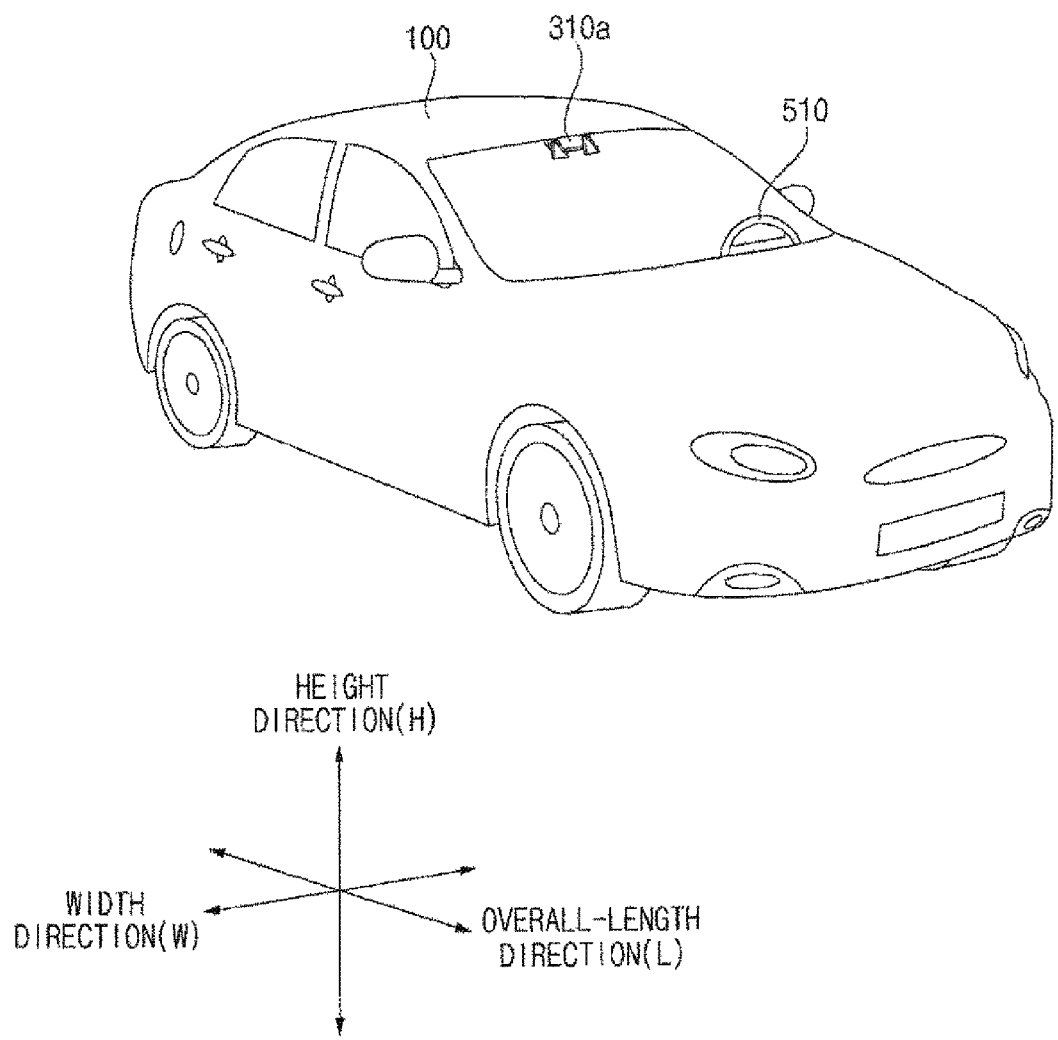
FIG. 1 is a view illustrating the external appearance of a vehicle according to an embodiment of the present invention.

FIG. 1 is a view illustrating the external appearance of a vehicle according to an embodiment of the present invention.

Figure 2:
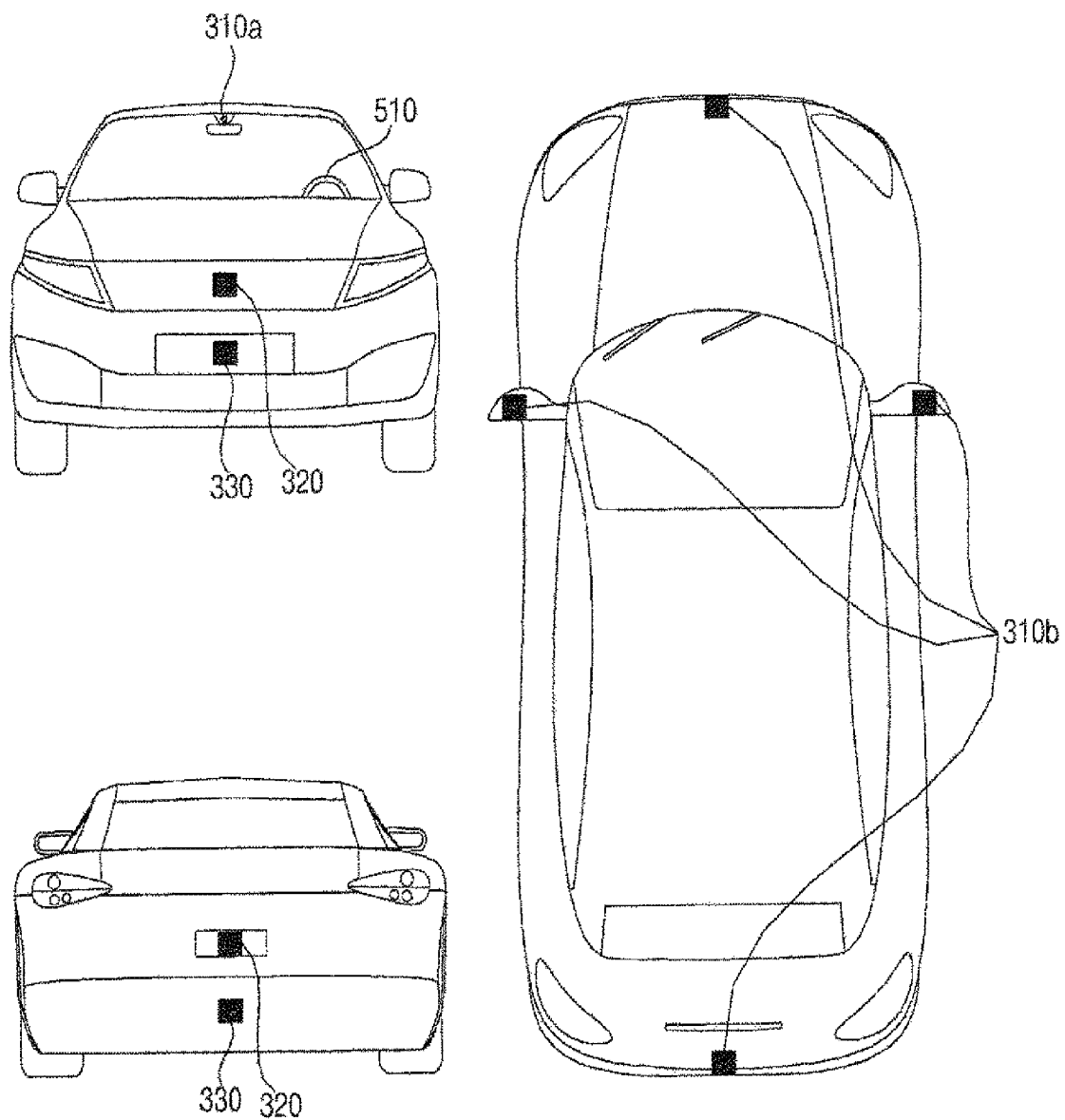
FIG. 2 is a view illustrating the external appearance of the vehicle according to the embodiment of the present invention, seen at various angles from the outside of the vehicle.

FIG. 2 is a view illustrating the external appearance of the vehicle according to the embodiment of the present invention, seen at various angles from the outside of the vehicle.

Figure 3:
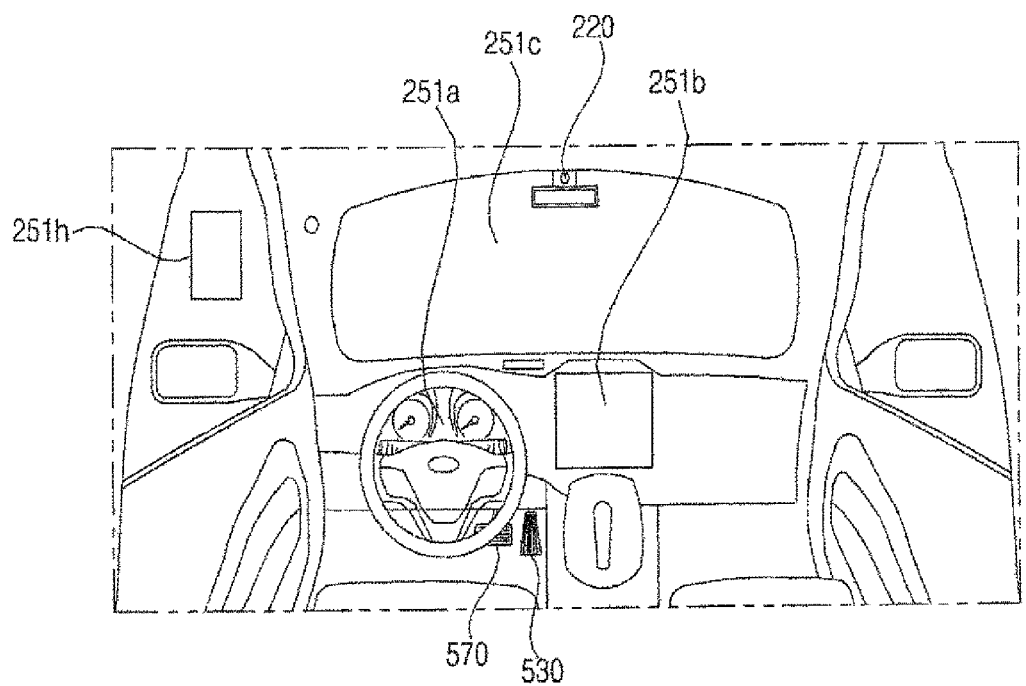
FIGS. 3 and 4 are views illustrating the interior of the vehicle according to the embodiment of the present invention.
Figure 4:
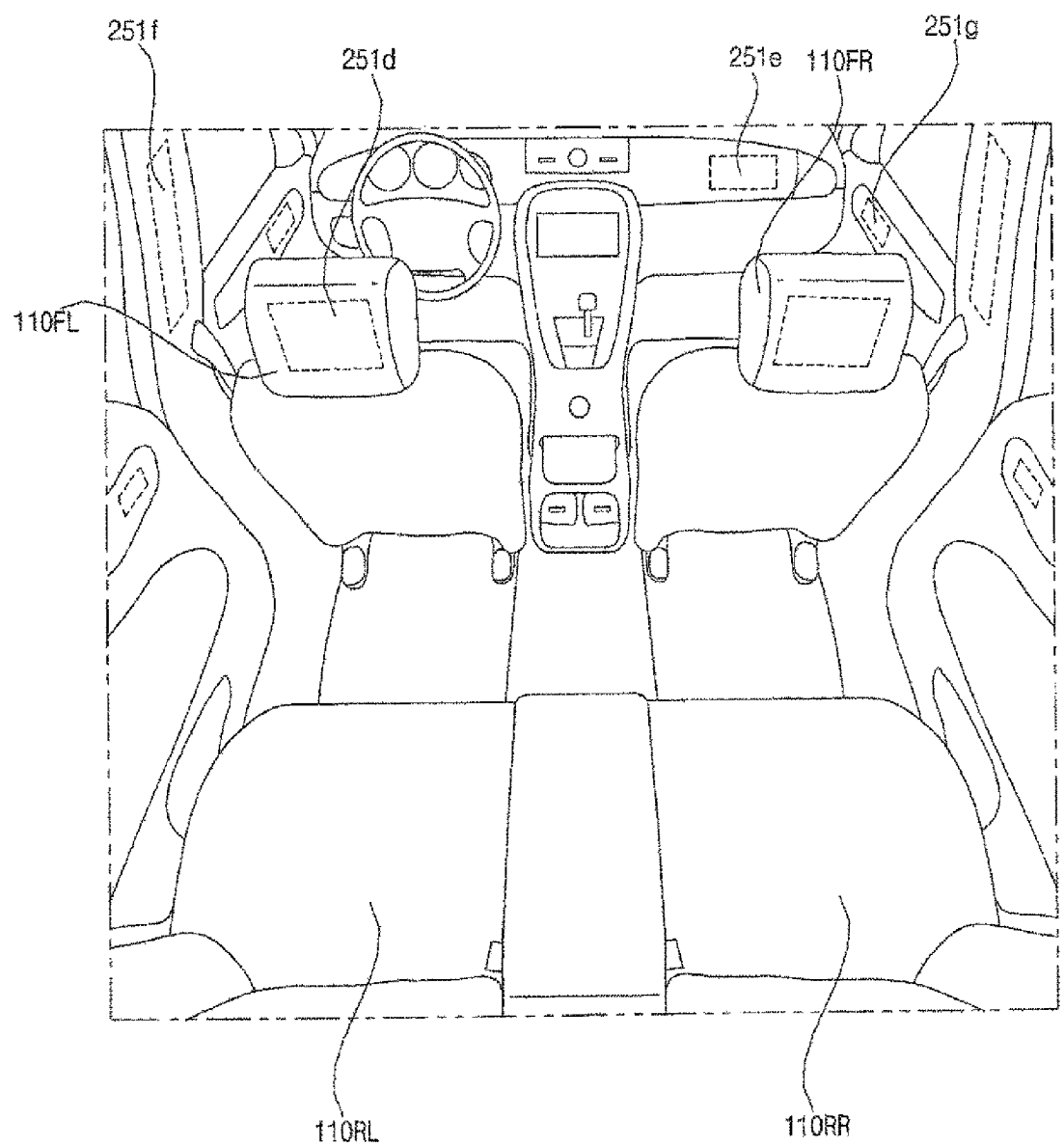

FIGS. 3 and 4 are views illustrating the interior of the vehicle according to the embodiment of the present invention.

Figure 5:
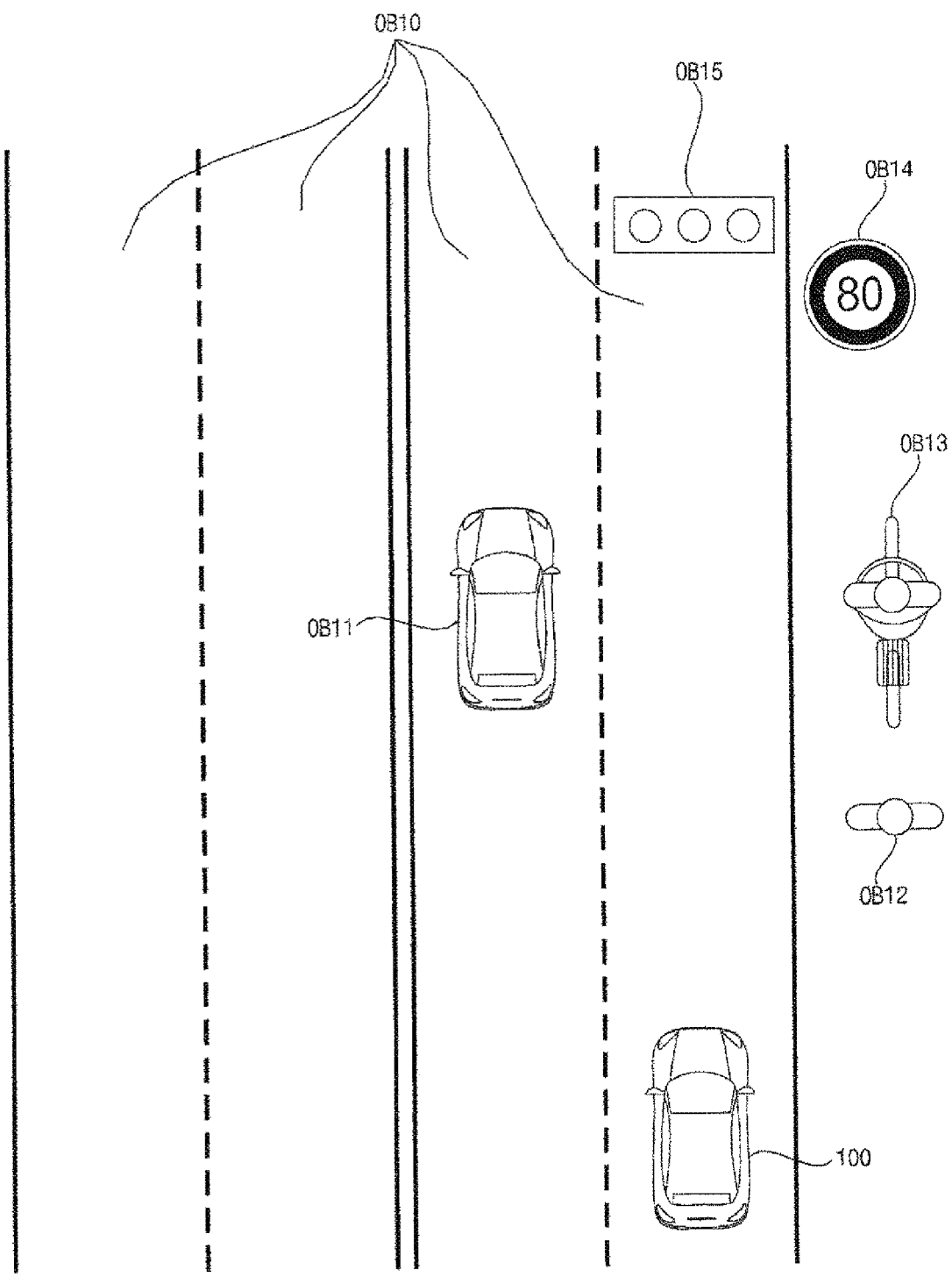
FIGS. 5 and 6 are views for explaining objects according to the embodiment of the present invention.
Figure 6:
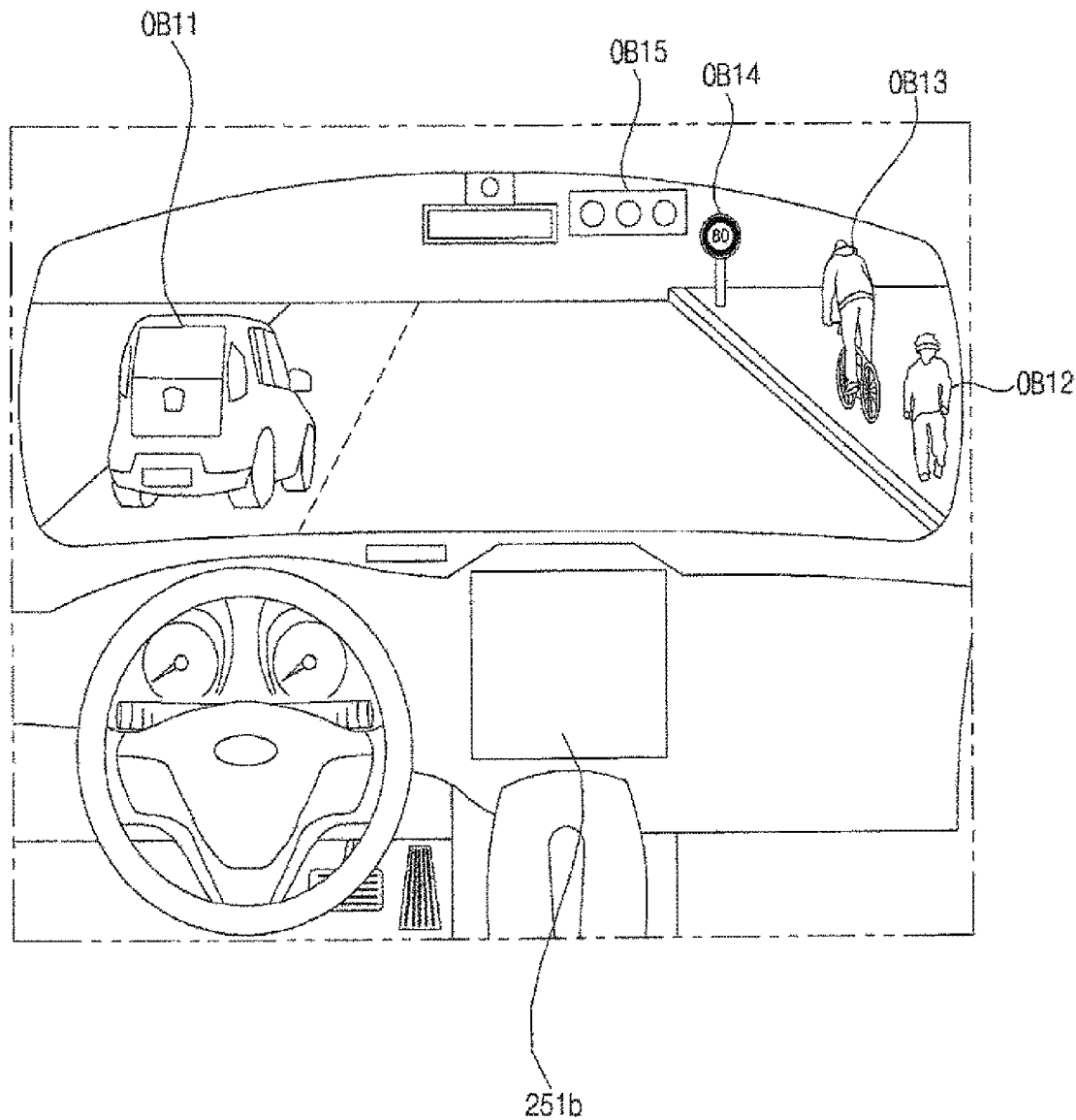

FIGS. 5 and 6 are views for explaining objects according to the embodiment of the present invention.

Figure 7:
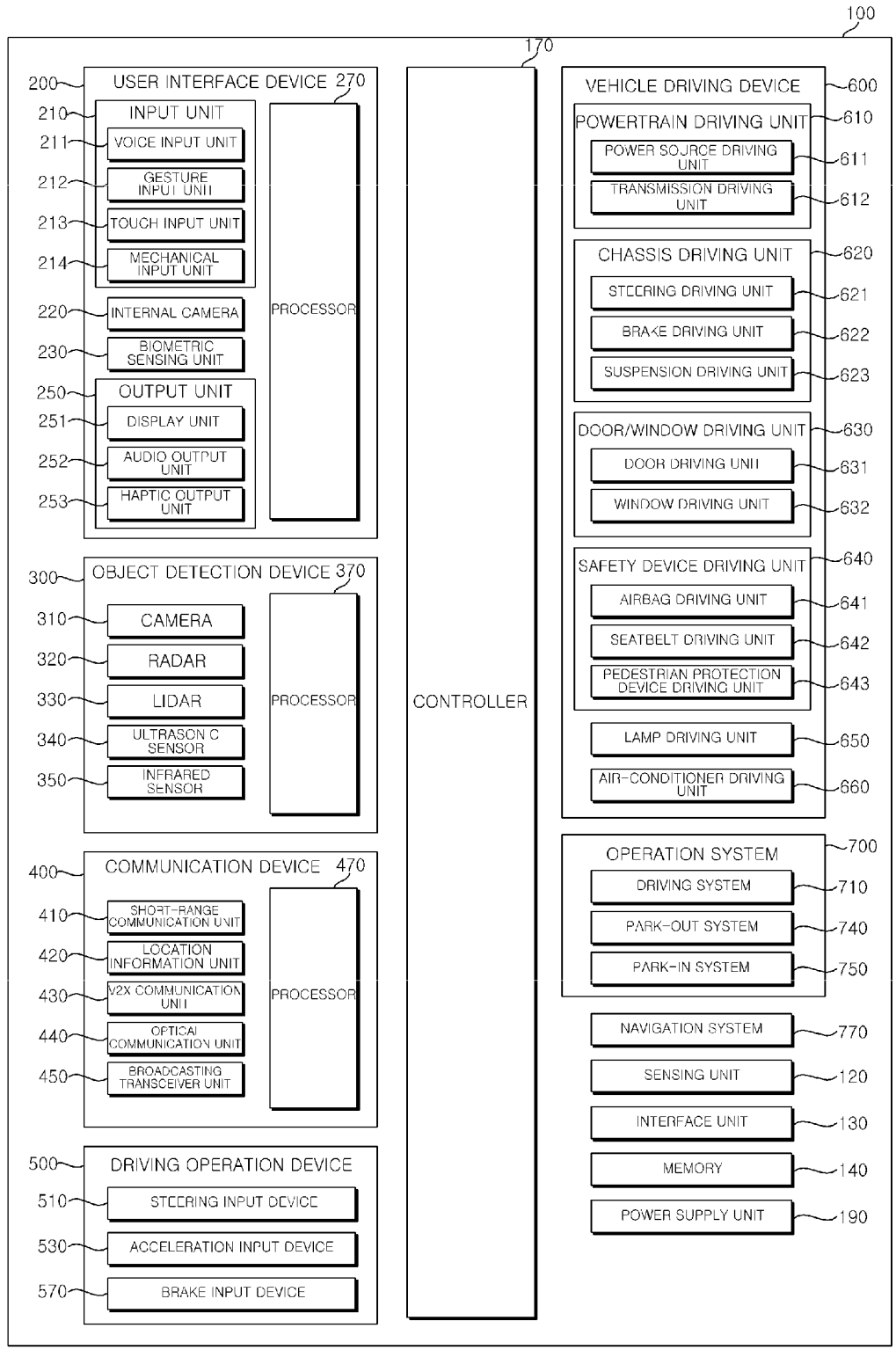
FIG. 7 is a block diagram for explaining the vehicle according to the embodiment of the present invention.

FIG. 7 is a block diagram for explaining the vehicle according to the embodiment of the present invention.

Referring to FIGS. 1 to 7, a vehicle 100 may include wheels configured to be rotated by a power source, and a steering input device 510 for controlling the travel direction of the vehicle 100.

The vehicle 100 may be an autonomous vehicle.

The vehicle 100 may be switched to an autonomous driving mode or a manual mode based on user input.

For example, the vehicle 100 may be switched from the manual mode to the autonomous driving mode or from the autonomous driving mode to the manual mode based on the user input received through a user interface device 200.

The vehicle 100 may be switched to the autonomous driving mode or the manual mode based on driving situation information.

The driving situation information may include at least one of information about objects outside the vehicle, navigation information, or vehicle state information.

For example, the vehicle 100 may be switched from the manual mode to the autonomous driving mode or from the autonomous driving mode to the manual mode based on the driving situation information generated by an object detection device 300.

For example, the vehicle 100 may be switched from the manual mode to the autonomous driving mode or from the autonomous driving mode to the manual mode based on the driving situation information received through a communication device 400.

The vehicle 100 may be switched from the manual mode to the autonomous driving mode or from the autonomous driving mode to the manual mode based on information, data, and signals provided from external devices.

When the vehicle 100 is driven in the autonomous driving mode, the autonomous vehicle 100 may be driven based on an operation system 700.

For example, the autonomous vehicle 100 may be driven based on information, data, or signals generated by a driving system 710, a park-out system 740, and a park-in system 750.

When the vehicle 100 is driven in the manual mode, the autonomous vehicle 100 may receive user input for driving through a driving operation device 500. The vehicle 100 may be driven based on the user input received through the driving operation device 500.

An overall length is a length from the front end to the rear end of the vehicle 100, an overall width is a width of the vehicle 100, and an overall height is a length from the bottom of the wheel to the roof of the vehicle 100. In the following description, an overall length direction L may be a direction based on which the overall length of the vehicle 100 is measured, an overall width direction W may be a direction based on which the overall width of the vehicle 100 is measured, and an overall height direction H may be a direction based on which the overall height of the vehicle 100 is measured.

As illustrated in FIG. 7, the vehicle 100 may include a user interface device 200, an object detection device 300, a communication device 400, a driving operation device 500, a vehicle driving device 600, an operation system 700, a navigation system 770, a sensing unit 120, an interface unit 130, a memory 140, a controller 170, and a power supply unit 190.

In some embodiments, the vehicle 100 may further include a new component in addition to the components described in the present disclosure, or may not include some of the described components.

The user interface device 200 is a device used to enable the vehicle 100 to communicate with a user. The user interface device 200 may receive user input and may provide information generated from the vehicle 100 to the user. The vehicle 100 may implement User Interfaces (UIs) or User Experience (UX) through the user interface device 200.

The user interface device 200 may include an input unit 210, an internal camera 220, a biometric sensing unit 230, an output unit 250, and a processor 270.

In some embodiments, the user interface device 200 may further include a new component in addition to the above-described components, or may not include some of the above-described components.

The input unit 210 is used to receive information from a user. Data collected by the input unit 210 may be analyzed by the processor 270, and may be recognized as a control command from the user.

The input unit 210 may be disposed inside the vehicle. For example, the input unit 210 may be disposed in a portion of a steering wheel, a portion of an instrument panel, a portion of a seat, a portion of each pillar, a portion of a door, a portion of a center console, a portion of a head lining, a portion of a sun visor, a portion of a windshield, a portion of a window, or the like.

The input unit 210 may include a voice input unit 211, a gesture input unit 212, a touch input unit 213, and a mechanical input unit 214.

The voice input unit 211 may convert a voice input of the user into an electrical signal. The converted electrical signal may be provided to the processor 270 or the controller 170. The voice input unit 211 may include one or more microphones.

The gesture input unit 212 may convert a gesture input of the user into an electrical signal. The converted electrical signal may be provided to the processor 270 or the controller 170.

The gesture input unit 212 may include at least one of an infrared sensor or an image sensor for sensing a gesture input of the user.

In some embodiments, the gesture input unit 212 may sense a three-dimensional gesture input of the user. To this end, the gesture input unit 212 may include a light output unit for emitting a plurality of infrared rays or a plurality of image sensors.

The gesture input unit 212 may sense a three-dimensional gesture input of the user using a Time-of-Flight (ToF) scheme, a structured light scheme, or a disparity scheme.

The touch input unit 213 may convert a touch input of the user into an electrical signal. The converted electrical signal may be provided to the processor 270 or the controller 170.

The touch input unit 213 may include a touch sensor for sensing a touch input of the user.

In some embodiments, the touch input unit 213 may be implemented as a touch screen by being integrated with a display unit 251. This touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, the door, or the like.

The internal camera 220 may acquire a vehicle interior image. The processor 270 may sense the state of a user based on the vehicle interior image. The processor 270 may acquire user gaze information from the vehicle interior image. The processor 270 may sense the user's gesture based on the vehicle interior image.

The biometric sensing unit 230 may acquire biometric information about a user. The biometric sensing unit 230 may include a sensor for acquiring biometric information about a user, and may acquire information about a fingerprint, heart beats, and the like of a user using the sensor. The biometric information may be used to authenticate the user.

The output unit 250 is used to generate a visual output, an acoustic output, or a haptic output.

The output unit 250 may include at least one of a display unit 251, an audio output unit 252, or a haptic output unit 253.

The display unit 251 may display graphic objects corresponding to various pieces of information.

The display unit 251 may include at least one of a Liquid Crystal Display (LCD), a Thin Film Transistor-LCD (TFT LCD), an Organic Light-Emitting Diode (OLED) display, a flexible display, a three-dimensional (3D) display, or an e-ink display.

The display unit 251 may be implemented as a touch screen by forming a multi-layered structure with the touch input unit 213 or by being integrated with the touch input unit 213.

The display unit 251 may be configured as a Head Up Display (HUD). If the display unit 251 is configured as a HUD, the display unit 251 may be provided with a projection module, and may output information through an image projected onto the windshield or the window.

The display unit 251 may include a transparent display. The transparent display may be attached onto the windshield or the window.

The transparent display may have a specific transparency and may display a specific screen. In order to be transparent, the transparent display may include at least one of a transparent Thin Film Electroluminescent (TFEL) display, a transparent OLED display, a transparent LCD, a transmissive transparent display, or a transparent LED display. The transparency of the transparent display is controllable.

The user interface device 200 may include a plurality of display units 251*a* to 251*g*.

The display unit 251 may be disposed in a portion of the steering wheel, portions 251*a*, 251*b* and 251*e* of the instrument panel, a portion 251*d* of the seat, a portion 251*f* of the pillar, a portion 251*g* of the door, a portion of the center console, a portion of the head lining, or a portion of the sun visor, or may be implemented in a portion 251*c* of the windshield or a portion 251*h* of the window.

The audio output unit 252 converts an electrical signal received from the processor 270 or the controller 170 into an audio signal and outputs the audio signal. To this end, the audio output unit 252 may include one or more speakers.

The haptic output unit 253 generates a haptic output. For example, the haptic output unit 253 may vibrate the steering wheel, the safety belt, or the seats 110FL, 110FR, 110RL, and 110RR, so that a user perceives the output.

The processor 270 may control the overall operation of each unit of the user interface device 200.

In some embodiments, the user interface device 200 may include a plurality of processors 270 or may not include a processor 270.

If the user interface device 200 does not include a processor 270, the user interface device 200 may operate under the control of a processor of another device in the vehicle 100, or under the control of the controller 170.

The user interface device 200 may be referred to as a vehicle display device.

The user interface device 200 may operate under the control of the controller 170.

The object detection device 300 is a device used to detect objects present outside the vehicle 100. The object detection device 300 may generate object information based on sensing data.

The object information may include information about the presence or absence of an object, information about the location of an object, information about the distance between the vehicle 100 and an object, and information about the relative speed of the vehicle 100 with respect to an object.

The object may be any of various items related to driving of the vehicle 100.

Referring to FIGS. 5 and 6, objects O may include lanes OB10, another vehicle OB11, a pedestrian OB12, a 2-wheeled vehicle OB13, traffic signals OB14 and OB15, light, a road, a structure, a speed bump, a geographic feature, an animal, and so on.

The lanes OB10 may include a traveling lane, a lane next to the traveling lane, and a lane in which an oncoming vehicle is traveling. The lanes OB10 may conceptually include left and right lines that define each of the lanes. The lanes may conceptually include a crossroad.

Another vehicle OB11 may be a vehicle traveling in the vicinity of the vehicle 100. Another vehicle may be a vehicle located within a predetermined distance from the vehicle 100. For example, another vehicle OB11 may be a vehicle that precedes or follows the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or a roadway.

The 2-wheeled vehicle OB13 may refer to a transportation means moving on two wheels around the vehicle 100. The 2-wheeled vehicle OB13 may be a transportation means having two wheels, located within a predetermined distance from the vehicle 100. For example, the 2-wheeled vehicle OB13 may be a motorcycle or bicycle on a sidewalk or a roadway.

The traffic signals may include a traffic light device OB15, a traffic sign OB14, and a symbol or text drawn or written on a road surface.

The light may be light generated from a lamp of another vehicle. The light may be light generated from a street lamp. The light may be sunlight.

The road may include a road surface, a curved road, an inclined road such as an uphill or downhill road, and so on.

The structure may be an object fixed on the ground near a road. For example, the structure may include a street lamp, a street tree, a building, a telephone pole, a traffic light device, a bridge, a curb, a wall, and so on.

The geographic feature may include a mountain, a hill, and so on.

Objects may be classified into mobile objects and fixed objects. For example, mobile objects may conceptually include another vehicle that is traveling and a pedestrian who is moving. For example, fixed objects may conceptually include a traffic signal, a road, a structure, another vehicle that is not moving, and a pedestrian who is not moving.

The object detection device 300 may include a camera 310, a Radio Detection and Ranging (RADAR) 320, a Light Detection and Ranging (LiDAR) 330, an ultrasonic sensor 340, an infrared sensor 350, and a processor 370.

In some embodiments, the object detection device 300 may further include a new component in addition to the above-described components, or may not include some of the above-described components.

In order to acquire a vehicle exterior image, the camera 310 may be disposed at an appropriate position on the exterior of the vehicle. The camera 310 may be a mono camera, a stereo camera 310*a*, an Around View Monitoring (AVM) camera 310*b*, or a 360-degree camera.

The camera 310 may acquire information about the location of an object, information about the distance to an object, or information about the relative speed with respect to an object using any of various image-processing algorithms.

For example, the camera 310 may acquire information about the distance to the object and information about the relative speed with respect to the object in the acquired image based on variation in the size of the object over time.

For example, the camera 310 may acquire information about the distance to the object and information about the relative speed with respect to the object through a pin hole model, road surface profiling, or the like.

For example, the camera 310 may acquire information about the distance to the object and information about the relative speed with respect to the object based on disparity information in the stereo image acquired by the stereo camera 310*a*.

For example, in order to acquire an image of a front view of the vehicle, the camera 310 may be disposed in the vicinity of a front windshield inside the vehicle. Alternatively, the camera 310 may be disposed around a front bumper or a radiator grill.

For example, in order to acquire an image of a rear view of the vehicle, the camera 310 may be disposed in the vicinity of a rear glass inside the vehicle. Alternatively, the camera 310 may be disposed around a rear bumper, a trunk, or a tailgate.

For example, in order to acquire an image of a side view of the vehicle, the camera 310 may be disposed in the vicinity of at least one of side windows inside the vehicle. Alternatively, the camera 310 may be disposed around a side mirror, a fender, or a door.

The camera 310 may provide the acquired image to the processor 370.

The RADAR 320 may include an electromagnetic wave transmitter and an electromagnetic wave receiver. The RADAR 320 may be embodied as pulse RADAR or continuous wave RADAR depending on the principle by which an electronic wave is emitted. The RADAR 320 may be embodied as Frequency Modulated Continuous Wave (FMCW)-type RADAR or Frequency Shift Keying (FSK)-type RADAR as a continuous wave RADAR scheme according to a signal waveform.

The RADAR 320 may detect an object using an electromagnetic wave based on a Time-of-Flight (ToF) scheme or a phase-shift scheme, and may detect the location of the detected object, the distance to the detected object, and the relative speed with respect to the detected object.

The RADAR 320 may be disposed at an appropriate position on the exterior of the vehicle in order to sense an object ahead of, behind, or beside the vehicle.

The LiDAR 330 may include a laser transmitter and a laser receiver. The LiDAR 330 may be implemented in a ToF scheme or a phase-shift scheme.

The LiDAR 330 may be implemented in a driven or non-driven manner.

If the LiDAR 330 is implemented in a driven manner, the LiDAR 330 may be rotated by a motor and may detect objects around the vehicle 100.

If the LiDAR 330 is implemented in a non-driven manner, the LiDAR 330 may detect objects located within a predetermined range from the vehicle 100 through optical steering. The vehicle 100 may include a plurality of non-driven-type LiDARs 330.

The LiDAR 330 may detect an object using laser light based on a ToF scheme or a phase-shift scheme, and may detect the location of the detected object, the distance to the detected object, and the relative speed with respect to the detected object.

The LiDAR 330 may be disposed at an appropriate position on the exterior of the vehicle in order to sense an object ahead of, behind, or beside the vehicle.

The ultrasonic sensor 340 may include an ultrasonic wave transmitter and an ultrasonic wave receiver. The ultrasonic sensor 340 may detect an object using ultrasonic waves, and may detect the location of the detected object, the distance to the detected object, and the relative speed with respect to the detected object.

The ultrasonic sensor 340 may be disposed at an appropriate position on the exterior of the vehicle in order to sense an object ahead of, behind, or beside the vehicle.

The infrared sensor 350 may include an infrared transmitter and an infrared receiver. The infrared sensor 340 may detect an object using infrared light, and may detect the location of the detected object, the distance to the detected object, and the relative speed with respect to the detected object.

The infrared sensor 350 may be disposed at an appropriate position on the exterior of the vehicle in order to sense an object ahead of, behind, or beside the vehicle.

The processor 370 may control the overall operation of each unit of the object detection device 300.

The processor 370 may compare data, sensed by the camera 310, the RADAR 320, the LiDAR 330, the ultrasonic sensor 340, and the infrared sensor 350, with pre-stored data, thereby detecting or classifying objects.

The processor 370 may detect an object and may track the detected object based on an acquired image. The processor 370 may perform operations including calculation of the distance to the object and calculation of the relative speed with respect to the object through an image-processing algorithm.

For example, the processor 370 may acquire information about the distance to the object and information about the relative speed with respect to the object in the acquired image based on variation in the size of the object over time.

For example, the processor 370 may acquire information about the distance to the object and information about the relative speed with respect to the object through a pin hole model, road surface profiling, or the like.

For example, the processor 370 may acquire information about the distance to the object and information about the relative speed with respect to the object based on disparity information in the stereo image acquired by the stereo camera 310a.

The processor 370 may detect an object and may track the detected object based on an electromagnetic wave that is transmitted, is reflected from the object, and then returns. The processor 370 may perform operations including calculation of the distance to the object and calculation of the relative speed with respect to the object based on the electromagnetic wave.

The processor 370 may detect an object and may track the detected object based on laser light that is transmitted, is reflected from the object, and then returns. The processor 370 may perform operations including calculation of the distance to the object and calculation of the relative speed with respect to the object based on the laser light.

The processor 370 may detect an object and may track the detected object based on an ultrasonic wave that is transmitted, is reflected from the object, and then returns. The processor 370 may perform operations including calculation of the distance to the object and calculation of the relative speed with respect to the object based on the ultrasonic wave.

The processor 370 may detect an object and may track the detected object based on infrared light that is transmitted, is reflected from the object, and then returns. The processor 370 may perform operations including calculation of the distance to the object and calculation of the relative speed with respect to the object based on the infrared light.

In some embodiments, the object detection device 300 may include a plurality of processors 370 or may not include a processor 370. For example, each of the camera 310, the RADAR 320, the LiDAR 330, the ultrasonic sensor 340, and the infrared sensor 350 may include an individual processor.

If the object detection device 300 does not include a processor 370, the object detection device 300 may operate under the control of a processor of a device in the vehicle 100, or under the control of the controller 170.

The object detection device 300 may operate under the control of the controller 170.

The communication device 400 is a device for communicating with an external device. Here, the external device may be another vehicle, a mobile terminal, or a server.

In order to realize communication, the communication device 400 may include at least one of a transmission antenna, a reception antenna, a Radio Frequency (RF) circuit capable of implementing various communication protocols, or an RF device.

The communication device 400 may include a short-range communication unit 410, a location information unit 420, a V2X communication unit 430, an optical communication unit 440, a broadcasting transceiver unit 450, an Intelligent Transport System (ITS) communication unit 460, and a processor 470.

In some embodiments, the communication device 400 may further include a new component in addition to the above-described components, or may not include some of the above-described components.

The short-range communication unit 410 is a unit for performing short-range communication. The short-range communication unit 410 may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (Wireless USB).

The short-range communication unit 410 may conduct short-range communication between the vehicle 100 and at least one external device by establishing wireless area networks.

The location information unit 420 is a unit configured to acquire information about the location of the vehicle 100. For example, the location information unit 420 may include a Global Positioning System (GPS) module or a Differential Global Positioning System (DGPS) module.

The V2X communication unit 430 is a unit used for wireless communication with a server (Vehicle to Infrastructure (V2I)), another vehicle (Vehicle to Vehicle (V2V)), or a pedestrian (Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device via light. The optical communication unit 440 may include an optical transmitter for converting an electrical signal into an optical signal and radiating the optical signal to the outside, and an optical receiver for converting a received optical signal into an electrical signal.

In some embodiments, the optical transmitter may be integrated with a lamp included in the vehicle 100.

The broadcasting transceiver unit 450 is a unit used to receive a broadcast signal from an external broadcasting management server or transmit a broadcast signal to the broadcasting management server through a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and may provide the received control signal to the controller 170 or a processor in the vehicle 100.

The processor 470 may control the overall operation of each unit of the communication device 400.

In some embodiments, the communication device 400 may include a plurality of processors 470 or may not include a processor 470.

If the communication device 400 does not include a processor 470, the communication device 400 may operate under the control of a processor of another device in the vehicle 100, or under the control of the controller 170.

The communication device 400 may be configured as a vehicle display device, together with the user interface device 200. In this case, the vehicle display device may be referred to as a telematics device or an Audio Video Navigation (AVN) device.

The communication device 400 may operate under the control of the controller 170.

The driving operation device 500 is a device used to receive user input for driving the vehicle.

In the manual mode, the vehicle 100 may be driven based on a signal provided by the driving operation device 500.

The driving operation device 500 may include a steering input device 510, an acceleration input device 530, and a brake input device 570.

The steering input device 510 may receive user input for steering the vehicle 100. The steering input device 510 may be configured in the form of a wheel for enabling steering input by being rotated. In some embodiments, the steering input device may be configured as a touch screen, a touchpad, or a button.

The acceleration input device 530 may receive user input for acceleration of the vehicle 100. The brake input device 570 may receive user input for deceleration of the vehicle 100. The acceleration input device 530 and the brake input device 570 may be configured as pedals. In some embodiments, the acceleration input device or the brake input device may be configured as a touch screen, a touchpad, or a button.

The driving operation device 500 may operate under the control of the controller 170.

The vehicle driving device 600 is a device used to electrically control the operation of various devices in the vehicle 100.

The vehicle driving device 600 may include a powertrain driving unit 610, a chassis driving unit 620, a door/window driving unit 630, a safety device driving unit 640, a lamp driving unit 650, and an air-conditioner driving unit 660.

In some embodiments, the vehicle driving device 600 may further include a new component in addition to the above-described components, or may not include some of the above-described components.

The vehicle driving device 600 may include a processor. Each unit of the vehicle driving device 600 may include an individual processor.

The powertrain driving unit 610 may control the operation of a powertrain device.

The powertrain driving unit 610 may include a power source driving unit 611 and a transmission driving unit 612.

The power source driving unit 611 may control a power source of the vehicle 100.

For example, if the power source is a fossil fuel-based engine, the power source driving unit 611 may perform electronic control of the engine. Therefore, the power source driving unit 611 may control the output torque of the engine. The power source driving unit 611 may adjust the engine output torque under the control of the controller 170.

For example, if the power source is an electrical energy-based motor, the power source driving unit 611 may control the motor. The power source driving unit 611 may adjust the rotational speed, torque, and so on of the motor under the control of the controller 170.

The transmission driving unit 612 may control a transmission.

The transmission driving unit 612 may adjust the state of the transmission. The transmission driving unit 612 may switch the state of the transmission to a drive (D) mode, a reverse (R) mode, a neutral (N) mode, or a parking (P) mode.

If the power source is an engine, the transmission driving unit 612 may adjust the engagement state of a gear in the drive (D) mode.

The chassis driving unit 620 may control the operation of a chassis device.

The chassis driving unit 620 may include a steering driving unit 621, a brake driving unit 622, and a suspension driving unit 623.

The steering driving unit 621 may perform electronic control of a steering apparatus in the vehicle 100. The steering driving unit 621 may change a moving direction of the vehicle.

The brake driving unit 622 may perform electronic control of a brake apparatus in the vehicle 100. For example, the brake driving unit 622 may decrease the speed of the vehicle 100 by controlling the operation of a brake disposed at a wheel.

The brake driving unit 622 may control a plurality of brakes individually. The brake driving unit 622 may independently control the braking power applied to each of a plurality of wheels.

The suspension driving unit 623 may perform electronic control of a suspension apparatus in the vehicle 100. For example, if a road is bumpy, the suspension driving unit 623 may control the suspension apparatus to reduce the vibration of the vehicle 100.

The suspension driving unit 623 may control a plurality of suspensions individually.

The door/window driving unit 630 may perform electronic control of a door apparatus or a window apparatus in the vehicle 100.

The door/window driving unit 630 may include a door driving unit 631 and a window driving unit 632.

The door driving unit 631 may perform control of a door apparatus. The door driving unit 631 may control the opening or closing of a plurality of doors in the vehicle 100. The door driving unit 631 may control the opening or closing of the trunk or the tailgate. The door driving unit 631 may control the opening or closing of the sunroof.

The window driving unit 632 may perform electronic control of a window apparatus. The window driving unit 632 may control the opening or closing of a plurality of windows in the vehicle 100.

The safety device driving unit 640 may perform electronic control of various safety apparatuses in the vehicle 100.

The safety device driving unit 640 may include an airbag driving unit 641, a seatbelt driving unit 642, and a pedestrian protection device driving unit 643.

The airbag driving unit 641 may perform electronic control of an airbag apparatus in the vehicle 100. For example, the airbag driving unit 641 may control the inflation of an airbag upon sensing an emergency situation.

The seatbelt driving unit 642 may perform electronic control of a seatbelt apparatus in the vehicle 100. For example, the seatbelt driving unit 642 may control securing of passengers on the seats 110FL, 110FR, 110RL and 110RR using seatbelts upon sensing an emergency situation.

The pedestrian protection device driving unit 643 may perform electronic control of a hood lift and a pedestrian airbag. For example, the pedestrian protection device driving unit 643 may control hood lift-up and inflation of the pedestrian airbag upon sensing a collision with a pedestrian.

The lamp driving unit 650 may perform electronic control of various lamp apparatuses in the vehicle 100.

The air-conditioner driving unit 660 may perform electronic control of an air conditioner in the vehicle 100. For example, if a vehicle internal temperature is high, the air-conditioner driving unit 660 may control the air conditioner to operate and supply cool air into the vehicle.

The vehicle driving device 600 may include a processor. Each unit of the vehicle driving device 600 may include an individual processor.

The vehicle driving device 600 may operate under the control of the controller 170.

The operation system 700 is a system that controls various operations of the vehicle 100. The operation system 700 may operate in the autonomous driving mode.

The operation system 700 may include a driving system 710, a park-out system 740, and a park-in system 750.

In some embodiments, the operation system 700 may further include a new component in addition to the above-described components, or may not include some of the above-described components.

The operation system 700 may include a processor. Each unit of the operation system 700 may include an individual processor.

In some embodiments, if the operation system 700 is implemented in software, the operation system 700 may be configured as a lower-level component of the controller 170.

In some embodiments, the operation system 700 may conceptually include at least one of the user interface device 270, the object detection device 300, the communication device 400, the driving operation device 500, the vehicle driving device 600, the navigation system 770, the sensing unit 120, or the controller 170.

The driving system 710 may perform driving of the vehicle 100.

The driving system 710 may perform driving of the vehicle 100 by receiving navigation information from the navigation system 770 and providing a control signal to the vehicle driving device 600.

The driving system 710 may perform driving of the vehicle 100 by receiving object information from the object detection device 300 and providing a control signal to the vehicle driving device 600.

The driving system 710 may perform driving of the vehicle 100 by receiving a signal from an external device through the communication device 400 and providing a control signal to the vehicle driving device 600.

The driving system 710 may conceptually include at least one of the user interface device 270, the object detection device 300, the communication device 400, the driving operation device 500, the vehicle driving device 600, the navigation system 770, the sensing unit 120, or the controller 170, and may perform driving of the vehicle 100.

The driving system 710 may be referred to as a vehicle driving control device.

The park-out system 740 may perform park-out of the vehicle 100.

The park-out system 740 may perform park-out of the vehicle 100 by receiving navigation information from the navigation system 770 and providing a control signal to the vehicle driving device 600.

The park-out system 740 may perform park-out of the vehicle 100 by receiving object information from the object detection device 300 and providing a control signal to the vehicle driving device 600.

The park-out system 740 may perform park-out of the vehicle 100 by receiving a signal from an external device through the communication device 400 and providing a control signal to the vehicle driving device 600.

The park-out system 740 may conceptually include at least one of the user interface device 270, the object detection device 300, the communication device 400, the driving operation device 500, the vehicle driving device 600, the navigation system 770, the sensing unit 120, or the controller 170, and may perform park-out of the vehicle 100.

The park-out system 740 may be referred to as a vehicle park-out control device.

The park-in system 750 may perform park-in of the vehicle 100.

The park-in system 750 may perform park-in of the vehicle 100 by receiving navigation information from the navigation system 770 and providing a control signal to the vehicle driving device 600.

The park-in system 750 may perform park-in of the vehicle 100 by receiving object information from the object detection device 300 and providing a control signal to the vehicle driving device 600.

The park-in system 750 may perform park-in of the vehicle 100 by receiving a signal from an external device through the communication device 400 and providing a control signal to the vehicle driving device 600.

The park-in system 750 may conceptually include at least one of the user interface device 270, the object detection device 300, the communication device 400, the driving operation device 500, the vehicle driving device 600, the navigation system 770, the sensing unit 120, or the controller 170, and may perform park-in of the vehicle 100.

The park-in system 750 may be referred to as a vehicle park-in control device.

The navigation system 770 may provide navigation information. The navigation information may include at least one of map information, set destination information, path information according to the destination setting, information about various objects on a path, lane information, or information about the current location of a vehicle.

The navigation system 770 may include a memory and a processor. The memory may store navigation information. The processor may control the operation of the navigation system 770.

In some embodiments, the navigation system 770 may receive information from an external device through the communication device 400, and may update pre-stored information using the received information.

In some embodiments, the navigation system 770 may be classified as a lower-level component of the user interface device 200.

The sensing unit 120 may sense the state of the vehicle. The sensing unit 120 may include an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, a brake pedal position sensor, and so on.

The inertial navigation unit (IMU) sensor may include at least one of an acceleration sensor, a gyro sensor, or a magnetic sensor.

The sensing unit 120 may acquire sensing signals of vehicle attitude information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle attitude information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The interface unit 130 may serve paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path through which electrical energy is supplied to a connected mobile terminal. If the mobile terminal is electrically connected to the interface unit 130, the interface unit 130 may supply electrical energy received from the power supply unit 190 to the mobile terminal under the control of the controller 170.

The memory 140 is electrically connected to the controller 170. The memory 140 may store basic data for a unit, control data for controlling operation of the unit, and input and output data. The memory 140 may be any of various storage devices realized in hardware, such as Read Only Memory (ROM), Random Access Memory (RAM), Erasable and Programmable ROM (EPROM), a flash drive, and a hard drive. The memory 140 may store various data for the overall operation of the vehicle 100, such as programs for performing processing or controlling by the controller 170.

In some embodiments, the memory 140 may be integrated with the controller 170 or may be configured as a lower-level component of the controller 170.

The controller 170 may control the overall operation of each unit in the vehicle 100. The controller 170 may be referred to as an Electronic Control Unit (ECU).

The power supply unit 190 may supply power needed for operating each component under the control of the controller 170. Particularly, the power supply unit 190 may receive power from a battery in the vehicle.

One or more processors and the controller 170 included in the vehicle 100 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or an electrical unit for executing other functions.

Figure 8:
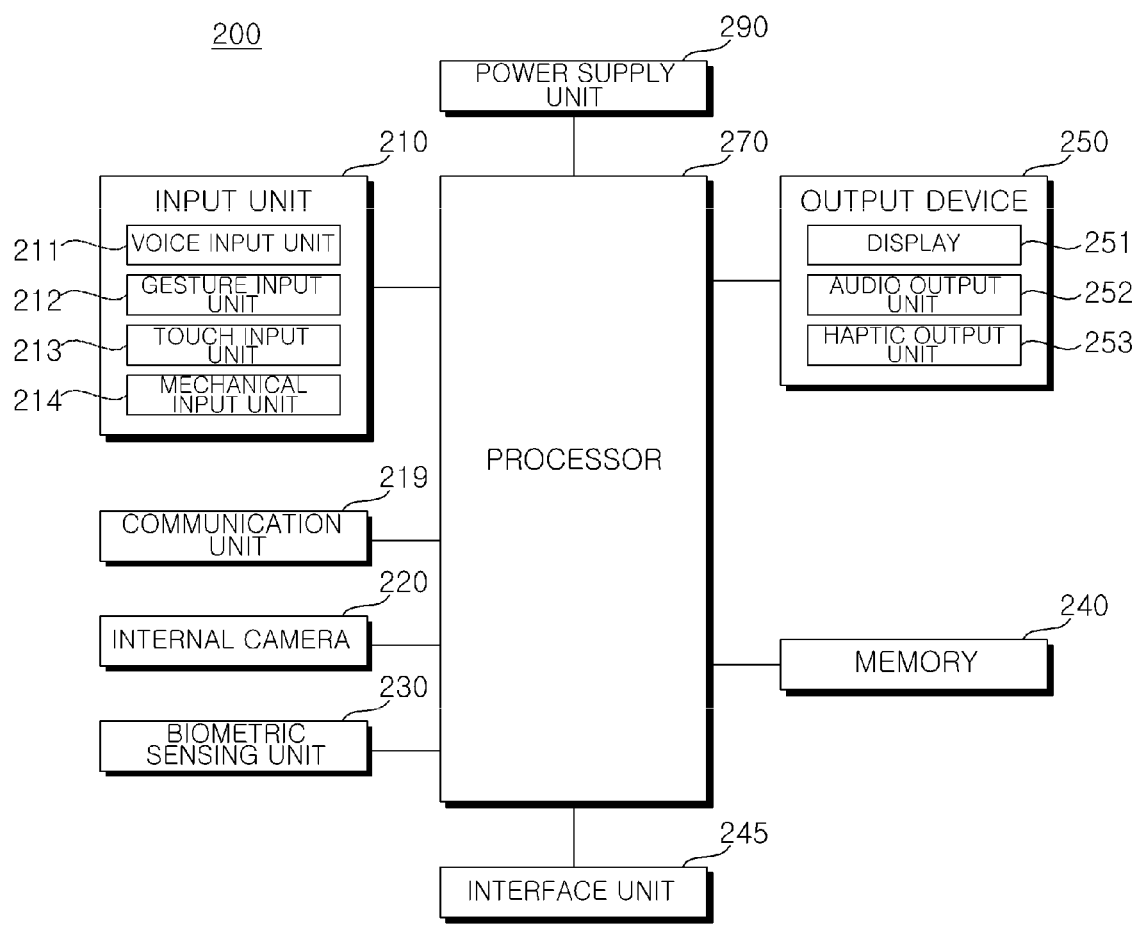
FIG. 8 is a control block diagram of a control authority transfer apparatus of an autonomous vehicle according to an embodiment of the present invention.

FIG. 8 is a control block diagram of a control authority transfer apparatus of an autonomous vehicle according to an embodiment of the present invention.

Referring to FIG. 8, the user interface device for a vehicle described with reference to FIGS. 1 to 7 may be referred to as a control authority transfer apparatus 200 of an autonomous vehicle.

The control authority transfer apparatus 200 of an autonomous vehicle may include an input unit 210, a communication unit 219, at least one internal camera 220, a biometric sensing unit 230, a memory 240, an interface unit 245, an output unit 250, at least one processor 270, and a power supply unit 290.

In some embodiments, the control authority transfer apparatus 200 of an autonomous vehicle may further include a new component in addition to the above-described components, or may not include some of the above-described components.

The control authority transfer apparatus 200 of an autonomous vehicle in FIG. 8 may include each component of the user interface device 200 for a vehicle described with reference to FIG. 7. Hereinafter, a duplicate description will be omitted, and the description will be given mainly focusing on parts that have not been described in FIG. 7.

The description made with reference to FIG. 7 may be applied to the input unit 210 and the biometric sensing unit 230.

The communication unit 219 may perform communication with a mobile terminal carried by a user through a preset communication scheme. In order to realize communication with a mobile terminal, the communication unit 219 may include at least one of a transmission antenna, a reception antenna, a Radio Frequency (RF) circuit capable of implementing various communication protocols, or an RF device.

The internal camera 220 may capture a vehicle interior image.

The vehicle interior image data acquired by the internal camera 220 may be transmitted to the processor 270.

The memory 240 is electrically connected to the processor 270. The memory 240 may store basic data for a unit, control data for controlling operation of the unit, and input and output data. The memory 240 may be any of various storage devices realized in hardware, such as ROM, RAM, EPROM, a flash drive, and a hard drive. The memory 240 may store various data for the overall operation of the user interface device 200, such as programs for performing processing or controlling by the processor 270. In some embodiments, the memory 240 may be integrated with the processor 270 or may be configured as a lower-level component of the processor 270.

The memory 240 may store data on a plurality of users. The memory 240 may store data on a plurality of users acquired through at least one of the input unit 210, the communication unit 219, the internal camera 220, or the biometric sensing unit 230.

The data on a plurality of users may include at least one of driving experience data, accident history data, age data, riding position data, or driving history data of each of the plurality of users.

In some embodiments, the data on a plurality of users may be received from a cloud. In this case, the memory 240 may store information in which the plurality of users matches preset priorities. For example, the memory 240 may store the priority list of the users determined according to the preset priorities.

The interface unit 245 may exchange information, signals, or data with other devices included in the vehicle 100. The interface unit 245 may transmit the received information, signals, or data to the processor 270. The interface unit 245 may transmit the information, signals, or data generated or processed by the processor 270 to other devices included in the vehicle 100. The interface unit 245 may receive information, signals, or data from other devices included in the vehicle 100. The interface unit 245 may be configured as at least one of a communication module, a terminal, a pin, a cable, a port, a circuit, an element, or a device.

The information, signals, or data received by the interface unit 245 may be provided to the processor 270.

The output unit 250 may include a display unit 251, an audio output unit 252, and a haptic output unit 253. The description made with reference to FIG. 7 may be applied to the output unit 250.

The processor 270 may control the overall operation of each unit of the control authority transfer apparatus 200 of an autonomous vehicle. The processor 270 may be electrically connected to at least one of the input unit 210, the internal camera 220, the biometric sensing unit 230, the memory 240, the interface unit 245, the output unit 250, or the power supply unit 290, and may exchange signals with the same.

The processor 270 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or an electrical unit for executing other functions.

When a user rides in the vehicle 100, the processor 270 may acquire user data through at least one of the input unit 210, the communication unit 219, the internal camera 220, or the biometric sensing unit 230, and may store the acquired user data in the memory 240. For example, the processor 270 may acquire user data from a mobile terminal carried by the user through the communication unit 219. The user data may include at least one of driving experience data, accident history data, age data, seating position data, or driving history data of the user.

The processor 270 may set driving operation priorities based on data on a plurality of users. The processor 270 may set a main user as a first-ranked driving operation user. The main user may be understood to be a user seated on a seat in which the main user is capable of operating the steering input device 510, the acceleration input device 530, and the brake input device 570. The processor 270 may set driving operation priorities of a plurality of sub-users based on at least one of driving experience data, accident history data, age data, seating position data, or driving history data of each of the plurality of users. As such, since driving operation priorities are set based on user data, the probability of occurrence of a traffic accident may be lowered in a manual driving mode.

The processor 270 may determine whether at least a part of the autonomous driving control has failed. At least a part of the autonomous driving control may fail due to the driving situation, a malfunction of the sensor of the object detection device 300, a processing error of the processor, or the like. In this case, the processor 270 may attempt to switch from the autonomous driving state to the manual driving state.

The processor 270 may determine whether the main user is in a state of being incapable of performing driving operation. The processor 270 may acquire information about the state of the main user based on the signal generated by at least one of the input unit 210, the communication unit 219, the internal camera 220, or the biometric sensing unit 230. The processor 270 may determine whether the main user is sleeping, whether the main user is having a meeting, whether the main user is playing a game, or whether the main user is oriented rearwards, and may determine whether the main user is in a state of being incapable of performing driving operation based on the determination result.

Upon determining that the main user is in a state of being incapable of performing driving operation in the state in which at least a part of the autonomous driving control has failed, the processor 270 may select a first sub-user among the plurality of sub-users as a driving operation user according to the driving operation priorities. For example, the processor 270 may select the user who has the longest driving experience among the plurality of sub-users as the first sub-user. For example, the processor 270 may select the user who has the history of the fewest accidents among the plurality of sub-users as the first sub-user. For example, the processor 270 may select a user who is in a specific age range among the plurality of sub-users as the first sub-user. For example, the processor 270 may select a user who is seated on the front seat among the plurality of sub-users as the first sub-user. For example, the processor 270 may select the user who has the best driving history, e.g. the smallest number of sudden acceleration operations or the smallest number of sudden braking operations, among the plurality of sub-users as the first sub-user.

The processor 270 may select a first device matching the first sub-user as a driving operation device. The first device may be a display device disposed around the seat on which the first sub-user is seated. The first device may be a mobile terminal carried by the first sub-user. The first device may be the input unit 210 that receives user input from the first sub-user. The first device may be the internal camera 220 that captures an image of the first sub-user. The first device may be a control device that is provided to the first sub-user when the first sub-user is selected.

During the autonomous driving control, the processor 270 may provide a user interface, through which the user is capable of performing operation related to failed control, to the user through the first device. The case in which the first device is a display device or a mobile terminal will be described by way of example.

The processor 270 may determine that lateral direction control has failed during the autonomous driving control. In this case, the processor 270 may perform control such that a driving operation screen is displayed on the display device or the mobile terminal matching the first sub-user. The driving operation screen may include a button for lateral-direction movement within a lane, a button for lateral-direction movement for changing lanes, and a button for lateral-direction movement for rotation. The lateral direction control may be understood to be steering control of the vehicle 100.

The processor 270 may determine that longitudinal direction control has failed during the autonomous driving control. In this case, the processor 270 may perform control such that a driving operation screen is displayed on the display device or the mobile terminal matching the first sub-user. The driving operation screen may include an area displaying a driving speed value. The driving operation screen may include a button for increasing the driving speed value in stages within a range below a preset speed limit value and a button for decreasing the driving speed value in stages. The longitudinal direction control may be understood to be acceleration/deceleration control of the vehicle 100.

As such, since the control authority is transferred to the user so that the user is capable of performing only operation related to failed control during the autonomous driving control, a minimum level of safety may be ensured regardless of the driving ability of the user.

The processor 270 may determine whether the main user enters a state of being capable of performing driving operation in the state in which the driving control is performed by the first sub-user. Upon determining that the main user enters a state of being capable of performing driving operation, the processor 270 may select a second device matching the main user as the driving operation device. For example, the processor 270 may select the steering input device 510, the acceleration input device 530, and the brake input device 570, which are disposed around the seat on which the main user is seated, as the driving operation device.

As such, when the main user is in a state of being capable of performing driving operation, authority may be transferred to the main user so that the main user stably controls driving using the steering wheel, the accelerator pedal, and the brake pedal.

The power supply unit 290 may supply power needed for operating each component under the control of the processor 270. Particularly, the power supply unit 290 may receive power from a battery in the vehicle.

Figure 9:
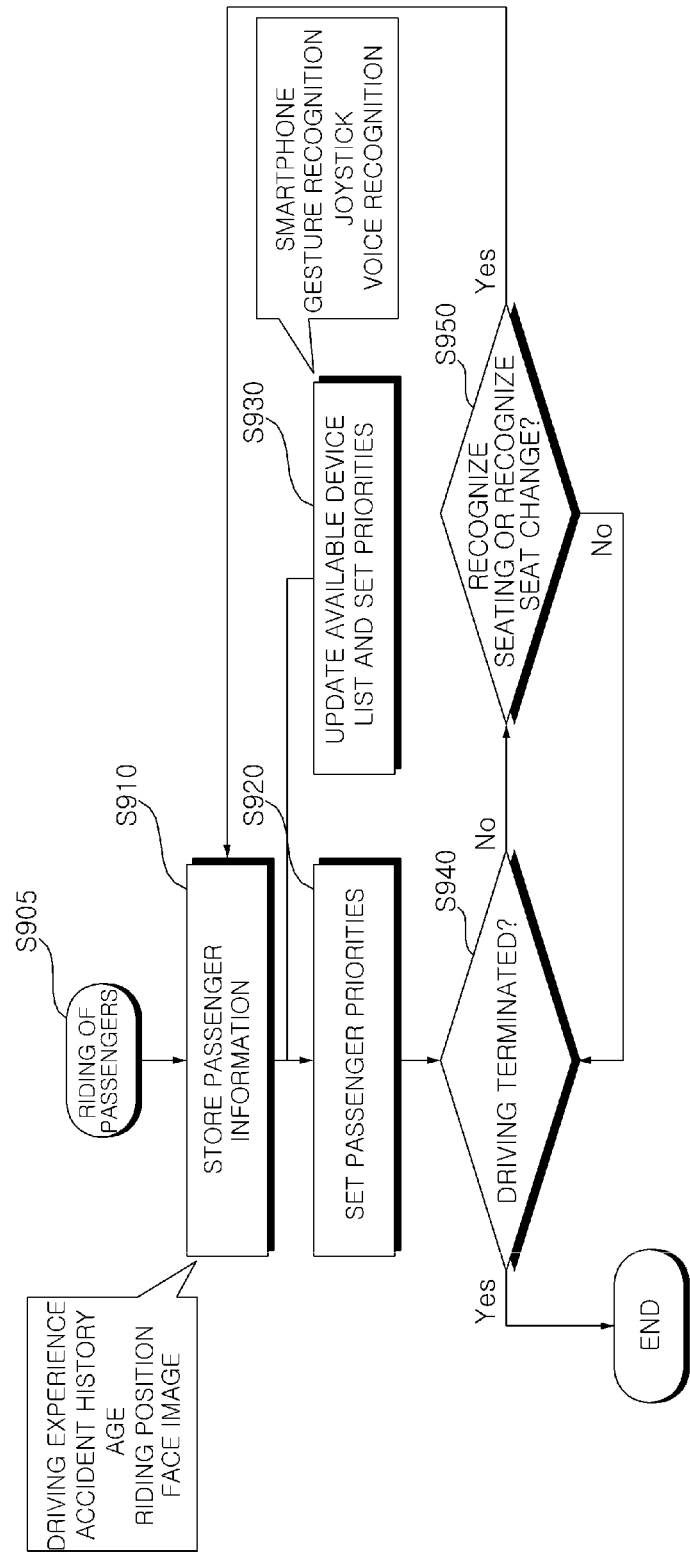
FIG. 9 is a flowchart of a control authority transfer method of an autonomous vehicle according to an embodiment of the present invention.

FIG. 9 is a flowchart of a control authority transfer method of an autonomous vehicle according to an embodiment of the present invention.

FIG. 9 is a diagram for explaining a data storage step and a driving operation priority setting step with respect to the user.

Referring to FIG. 9, when a passenger rides in the vehicle (S905), the processor 270 may store passenger data acquired from at least one of the input unit 210, the communication unit 219, the internal camera 220, or the biometric sensing unit 230 (S910). The processor 270 may store data on a plurality of users in the memory 240.

The processor 270 may set driving operation priorities based on the data on the plurality of passengers (S920). For example, the processor 270 may set driving operation priorities of the plurality of sub-users based on at least one of driving experience data, accident history data, age data, seating position data, or driving history data of each of the plurality of users.

The processor 270 may update the list of available devices and may set the priorities thereof (S930). The processor 270 may update the list of devices that respectively match the plurality of sub-users. The priorities of the devices may be set according to the priorities of the sub-users who respectively match the devices.

When the driving of the vehicle 100 is terminated (S940), the process may be terminated. When the driving of the vehicle 100 is not terminated (S940) and when the seat on which the user is seated is changed (S950), the operation after step S910 may be performed again.

When a sub-user has a mobile terminal, the processor 270 may receive passenger data from the mobile terminal through the communication unit 219. When the sub-user moves to another seat, the processor 270 may update data on the passenger's seat based on the signal received from the mobile terminal.

When the sub-user does not have a mobile terminal, the processor 270 may receive passenger data through a device disposed around the sub-user's seat. The processor 270 may update seating position data when the passenger data is updated.

Figure 10:
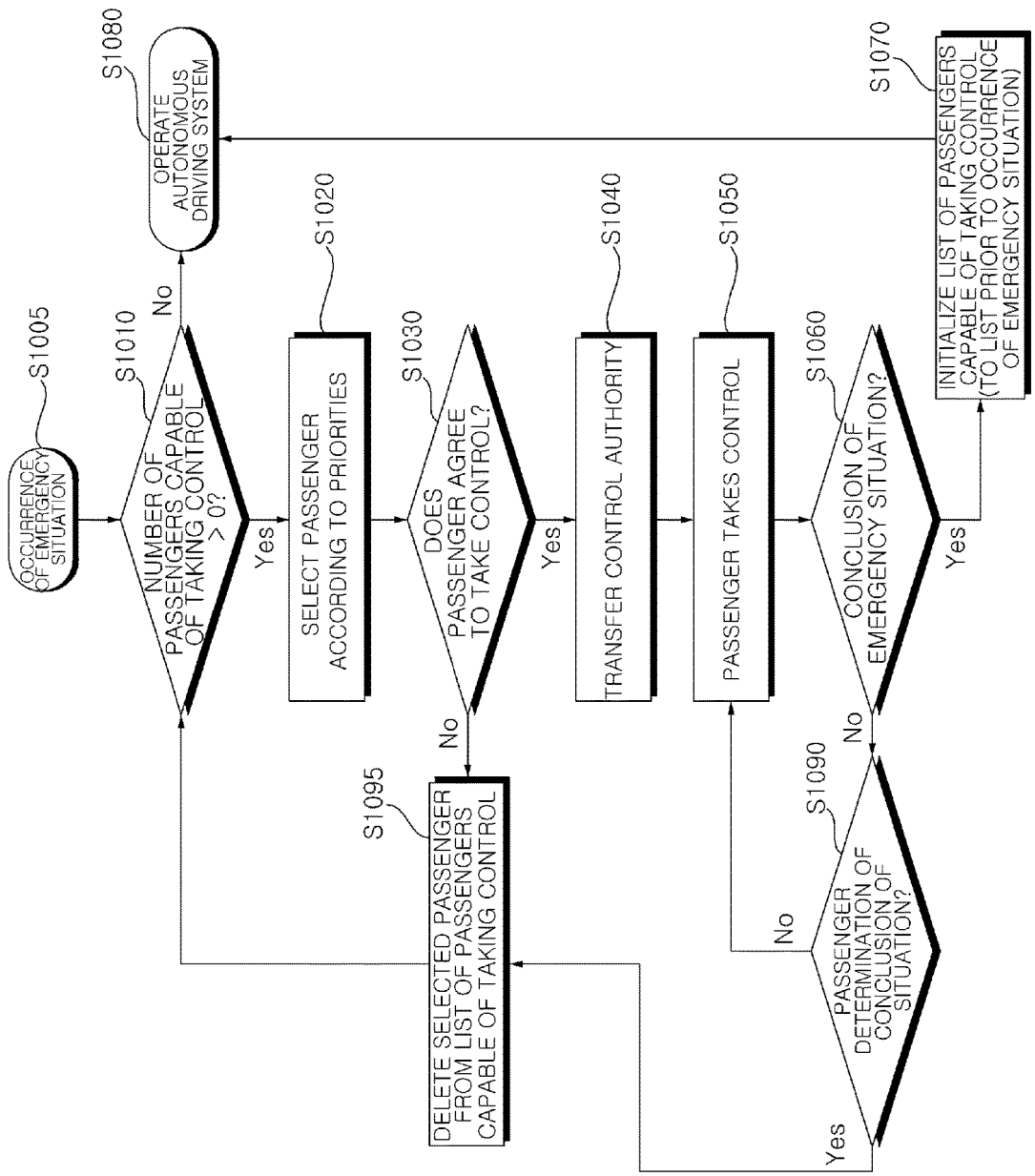
FIG. 10 is a flowchart of the control authority transfer method of an autonomous vehicle according to the embodiment of the present invention.

FIG. 10 is a flowchart of the control authority transfer method of an autonomous vehicle according to the embodiment of the present invention.

FIG. 10 is a diagram for explaining the control authority transfer operation. The data storage step S910 and the driving operation priority setting step S920 with respect to the user in FIG. 9 are performed prior to each step in FIG. 10.

Referring to FIG. 10, an emergency situation may occur in an autonomous driving state (S1005). The emergency situation may be a situation in which the main user is in a state of being incapable of performing driving operation in the state in which at least a part of the autonomous driving control has failed. At step S1005, the processor 270 may determine whether the main user is in a state of being capable of performing driving operation in the state in which at least a part of the autonomous driving control has failed.

The processor 270 may determine whether a passenger capable of taking control is present (S1010). The processor 270 may determine whether there is at least one sub-user other than the main user. When there is no passenger who is capable of taking control, the processor 270 may continue to operate the autonomous driving system (S1080). The processor 270 may maintain the autonomous driving state.

Upon determining that there is at least one passenger capable of taking control, the processor 270 may select a passenger according to the driving operation priorities (S1020). Upon determining that the main user is in a state of being incapable of performing driving operation in the state in which at least a part of the autonomous driving control has failed, the processor 270 may select a first sub-user among the plurality of sub-users as a driving operation user according to the driving operation priorities.

When the passenger agrees to control the vehicle 100 (S1030), the processor 270 may transfer control authority to the passenger (S1040), and the passenger may control the vehicle 100 (S1050). The processor 270 may receive user input from the first sub-user through the input unit 210. The processor 270 may determine whether the first sub-user has indicated agreement based on the user input. The processor 270 may select a first device matching the first sub-user as a driving operation device. The vehicle 100 may travel based on the signal generated by the first device. The signal generated by the first device may be provided to the vehicle driving device. The first device may be a display device or a mobile terminal.

Step S1005 of determining whether the main user is in a state of being capable of performing driving operation in the state in which at least a part of the autonomous driving control has failed may include a step of determining that lateral direction control has failed during the autonomous driving control. In this case, step S1040 of selecting the first device as a driving operation device may include a step of performing control such that a driving operation screen is displayed on the display device. Here, the driving operation screen may include a button for lateral-direction movement within a lane, a button for lateral-direction movement for changing lanes, and a button for lateral-direction movement for rotation.

Step S1005 of determining whether the main user is in a state of being capable of performing driving operation in the state in which at least a part of the autonomous driving control has failed may include a step of determining that longitudinal direction control has failed during the autonomous driving control. In this case, step S1040 of selecting the first device as a driving operation device may include a step of performing control such that a driving operation screen is displayed on the display device. Here, the driving operation screen may include an area displaying a driving speed value. The driving operation screen may include a button for increasing the driving speed value in stages within a range below a preset speed limit value and a button for decreasing the driving speed value in stages.

The processor 270 may determine whether the emergency situation has concluded (S1060).

Upon determining that the emergency situation has concluded, the processor 170 may initialize the list of passengers capable of taking control, and may continue to operate the autonomous driving system (S1080).

Upon determining that the emergency situation has not concluded, according to the passenger's determination on whether the situation has concluded (S1090), the processor 170 may maintain control by the passenger (S1050), or may delete the selected passenger from the list of passengers capable of taking control (S1095), and then the process may return to step S1010.

In addition, the control authority transfer method of an autonomous vehicle may further include, when it is determined that the main user is in a state of being capable of performing driving operation, a step of selecting a second device matching the main user as a driving operation device.

The system may include an autonomous driving system 700, a device 20 that matches a user, and a control authority transfer apparatus 200 of an autonomous vehicle.

When the vehicle is an autonomous vehicle, the above-described operation system 700 may be referred to as an autonomous driving system 700.

The device 20 may be understood to be a device that matches the user. For example, the device may be a mobile terminal (e.g. a smartphone) carried by the user.

Alternatively, for example, the device 20 may be at least one of a display device, a voice input unit 211, a gesture input unit 212, a mechanical input unit 214, or an internal camera 220, which is located at a part (e.g. a door, a cockpit, a seat, a headrest, etc.) around the seat on which the user is seated. The display device, the voice input unit 211, the gesture input unit 212, the mechanical input unit 214, and the internal camera 220 may be conceptually described as being included in an in-vehicle device 20b.

The above description may be applied to the control authority transfer apparatus 200 of an autonomous vehicle.

Figure 11:
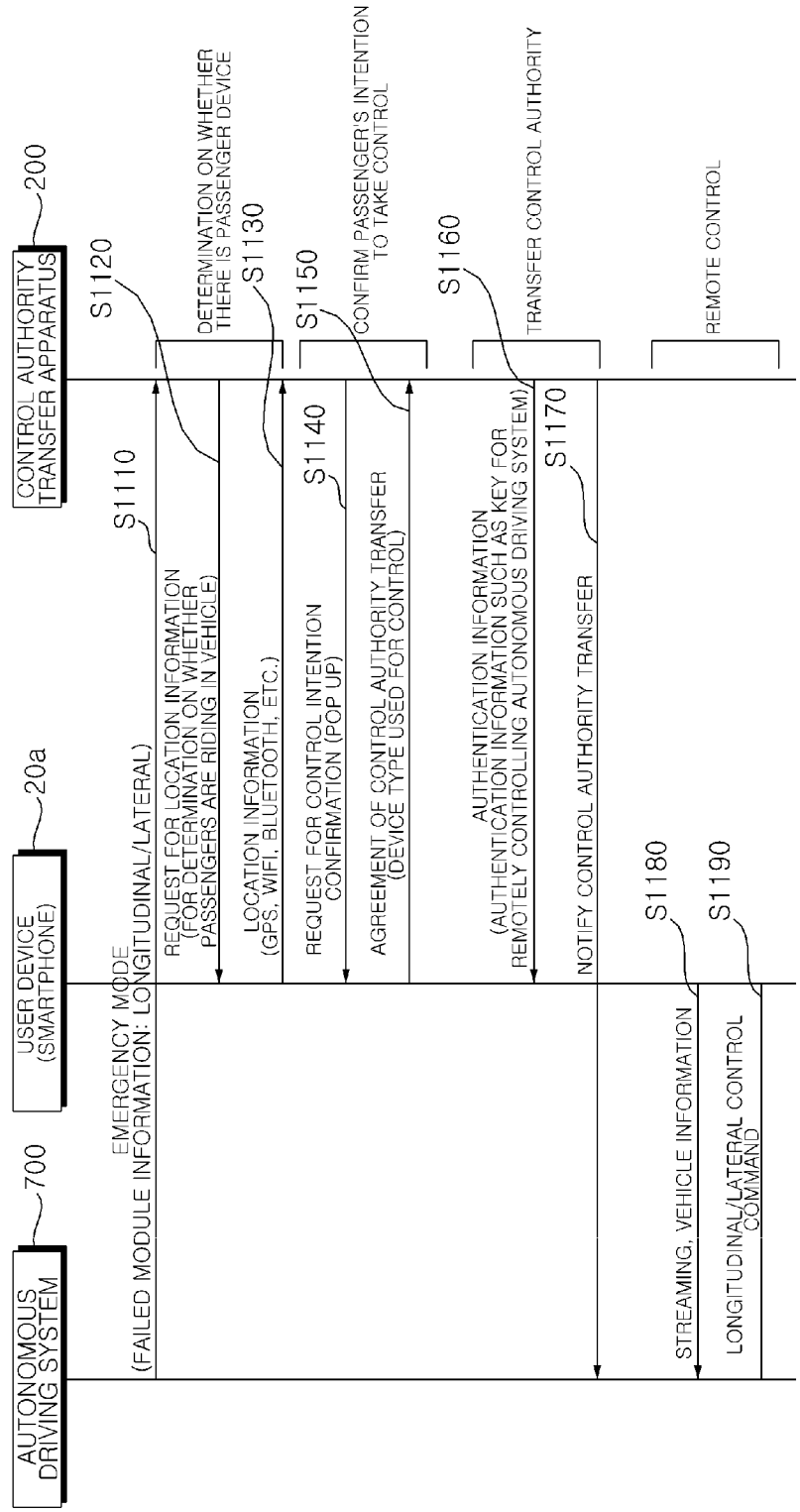
FIG. 11 is a signal flow diagram of the system according to the embodiment of the present invention.

FIG. 11 is a signal flow diagram of the system according to the embodiment of the present invention.

Referring to FIG. 11, the autonomous driving system 700 may transmit state information of the vehicle 100 to the control authority transfer apparatus 200 (S1110). The control authority transfer apparatus 200 may determine whether at least a part of the autonomous driving control fails based on the received state information. In some embodiments, the autonomous driving system 700 may determine whether at least a part of the autonomous driving control fails. The autonomous driving system 700 may transmit information about whether at least a part of the autonomous driving control fails to the control authority transfer apparatus 200.

The control authority transfer apparatus 200 may transmit a request for location information to the mobile terminal 20a of the user (S1120), and may receive location information (S1130) therefrom. For example, the control authority transfer apparatus 200 may transmit a request for location information to the first device that matches the sub-user selected at step S1020, and may receive location information therefrom.

The control authority transfer apparatus 200 may transmit a request for control intention confirmation to the mobile terminal 20a of the user (S1140), and may receive a control authority transfer agreement signal therefrom (S1150). For example, the control authority transfer apparatus 200 may confirm the control intention of the user through the first device that matches the sub-user selected at step S1020.

The control authority transfer apparatus 200 may transmit authentication information to the mobile terminal 20a of the user (S1160). The authentication information may include authentication information such as a key for remotely controlling the autonomous driving system. The control authority transfer apparatus 200 may notify the autonomous driving system 700 of the transfer of control authority (S1170).

The autonomous driving system 700 may transmit streaming data and vehicle information necessary for driving to the mobile terminal 20a of the user (S1180). In some embodiments, the control authority transfer apparatus 200 may transmit streaming data and vehicle information to the mobile terminal 20a of the user. The streaming data may be data on a real-time external situation acquired through the object detection device 300. For example, the streaming data may include real-time image data captured by the camera 310. The vehicle information may be information provided by the sensing unit 120.

The mobile terminal 20a of the user may provide a signal for controlling the movement of the vehicle 100 to the autonomous driving system 700 (S1190). The signal for controlling the movement of the vehicle 100 may be a signal based on user input through the mobile terminal 20a.

Figure 12:
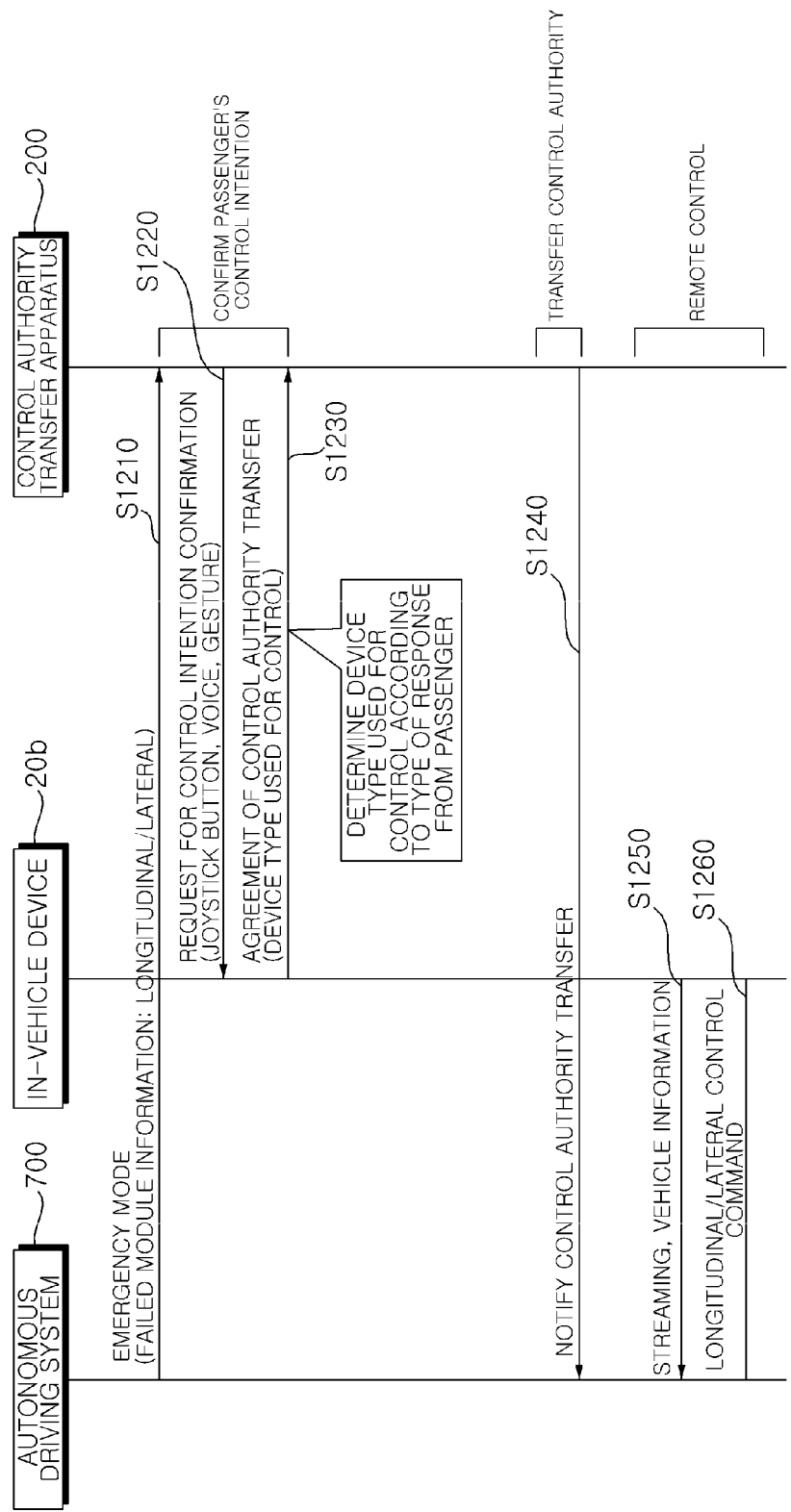
FIG. 12 is a signal flow diagram of the system according to the embodiment of the present invention.

FIG. 12 is a signal flow diagram of the system according to the embodiment of the present invention.

Referring to FIG. 12, the autonomous driving system 700 may transmit state information of the vehicle 100 to the control authority transfer apparatus 200 (S1210). The control authority transfer apparatus 200 may determine whether at least a part of the autonomous driving control has failed based on the received state information. In some embodiments, the autonomous driving system 700 may determine whether at least a part of the autonomous driving control has failed. The autonomous driving system 700 may transmit information about whether at least a part of the autonomous driving control has failed to the control authority transfer apparatus 200.

The control authority transfer apparatus 200 may transmit a request for control intention confirmation to the in-vehicle device 20b (S1220), and may receive a control authority transfer agreement signal therefrom (S1230). For example, the control authority transfer apparatus 200 may confirm the control intention of the user through the first device that matches the sub-user selected at step S1020. The control authority transfer apparatus 200 may select any one of the plurality of in-vehicle devices 20b as a driving operation device according to the response signal from the user.

The control authority transfer apparatus 200 may notify the autonomous driving system 700 of the transfer of control authority (S1240).

The autonomous driving system 700 may transmit streaming data and vehicle information necessary for driving to the in-vehicle device 20b (S1250). In some embodiments, the control authority transfer apparatus 200 may transmit streaming data and vehicle information to the in-vehicle device 20b. The streaming data may be data on a real-time external situation acquired through the object detection device 300. For example, the streaming data may include real-time image data captured by the camera 310. The vehicle information may be information provided by the sensing unit 120.

The mobile terminal 20a of the user may provide a signal for controlling the movement of the vehicle 100 to the autonomous driving system 700 (S1260). The signal for controlling the movement of the vehicle 100 may be a signal based on user input through the in-vehicle device 20b.

FIGS. 13 to 22 are views for explaining operation according to various examples of the electronic devices of the present invention.

Figure 13:
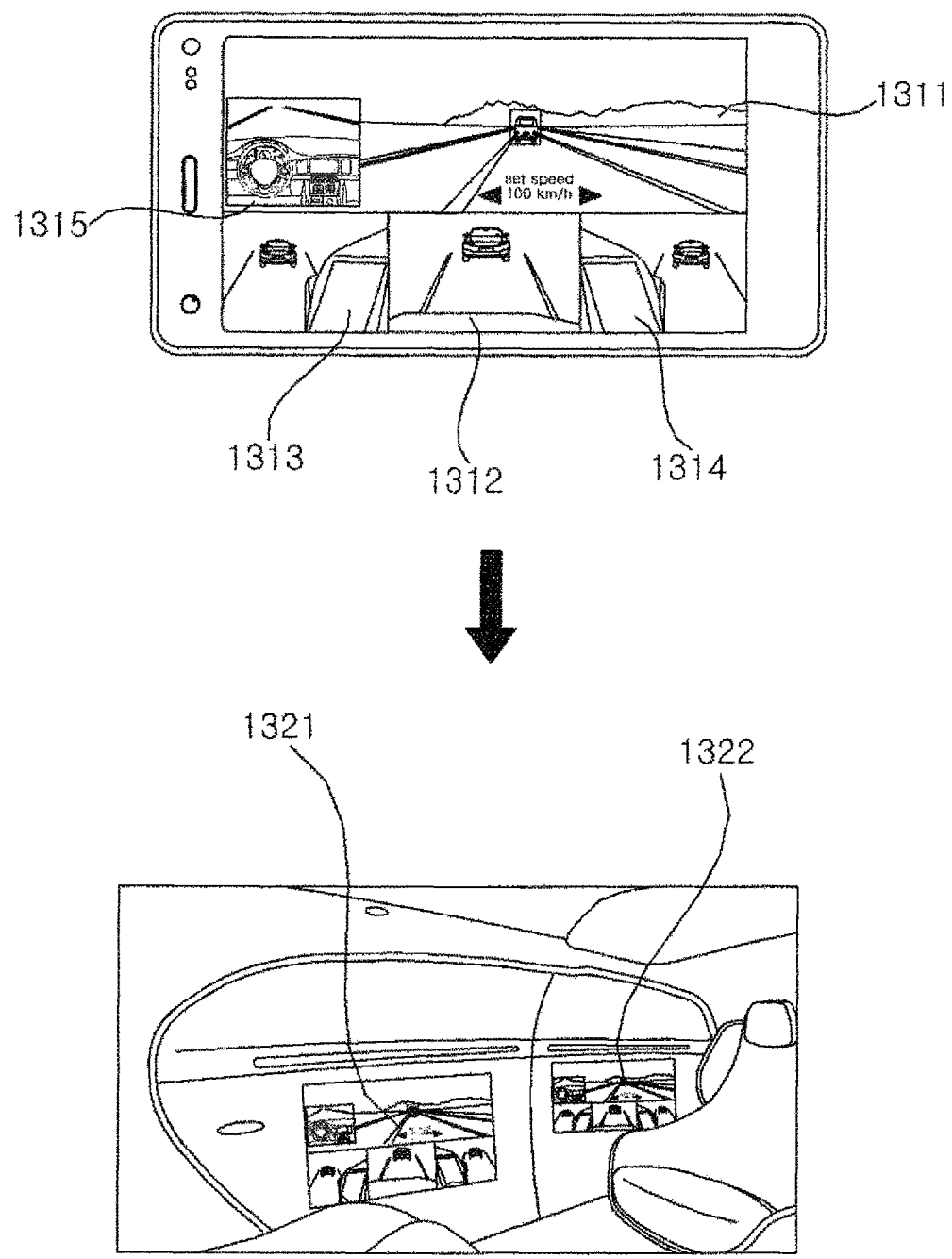
FIGS. 13 to 22 are views for explaining operation according to various examples of electronic devices of the present invention.
Figure 14A:
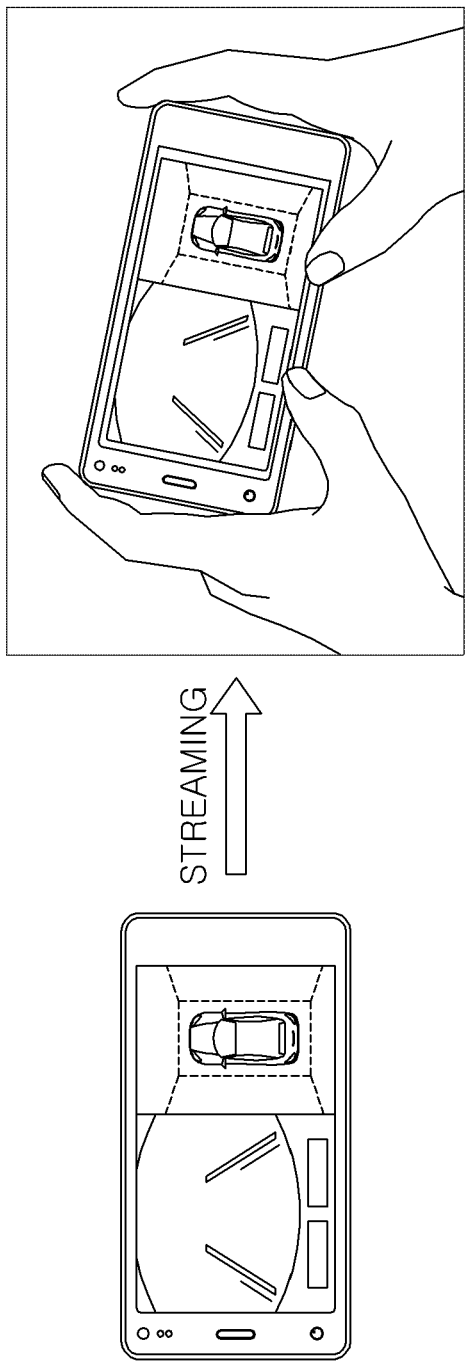
Figure 14B:
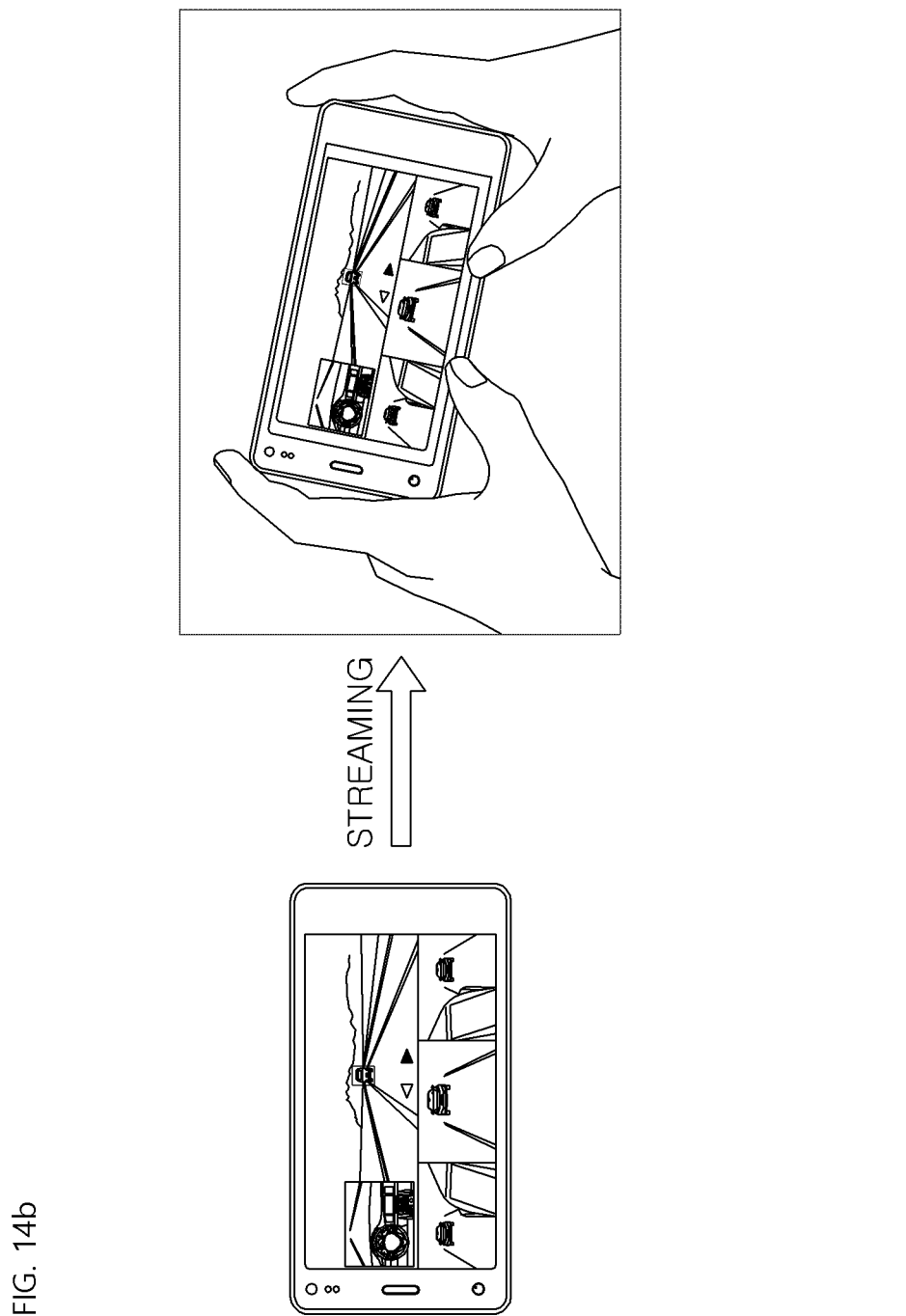

FIGS. 13 to 14b illustrate operation of transmitting and receiving streaming data.

The processor 270 may receive image data from a plurality of cameras mounted in the vehicle 100. The processor 270 may receive image data from at least one of the camera 310 or the internal camera 220. For example, the processor 270 may receive data on a front image 1311, data on a rear image 1312, data on side images 1313 and 1314, and data on an interior image 1315 of the vehicle 100.

The processor 270 may transmit image data to the devices 1321 and 1322 matching the user in a streaming manner. Here, the devices 1321 and 1322 may be at least one of the display device provided in the vehicle 100 or the mobile terminal of the user.

As illustrated in FIGS. 14a and 14b, the processor 270 may determine an image that is to be transmitted to a device matching the user according to the driving speed of the vehicle 100. As illustrated in FIG. 14a, when the vehicle 100 travels at a low speed (e.g. less than 10 km/h), the processor 270 may transmit front image data and around view image data of the vehicle to the device. As illustrated in FIG. 14b, when the vehicle 100 travels at a medium speed or a high speed (e.g. 10 km/h or higher), the processor 270 may transmit front image data, rear image data, side image data, and interior image data of the vehicle to the device.

FIGS. 15a to 15d illustrate the case in which autonomous driving control fails.

Figure 15A:
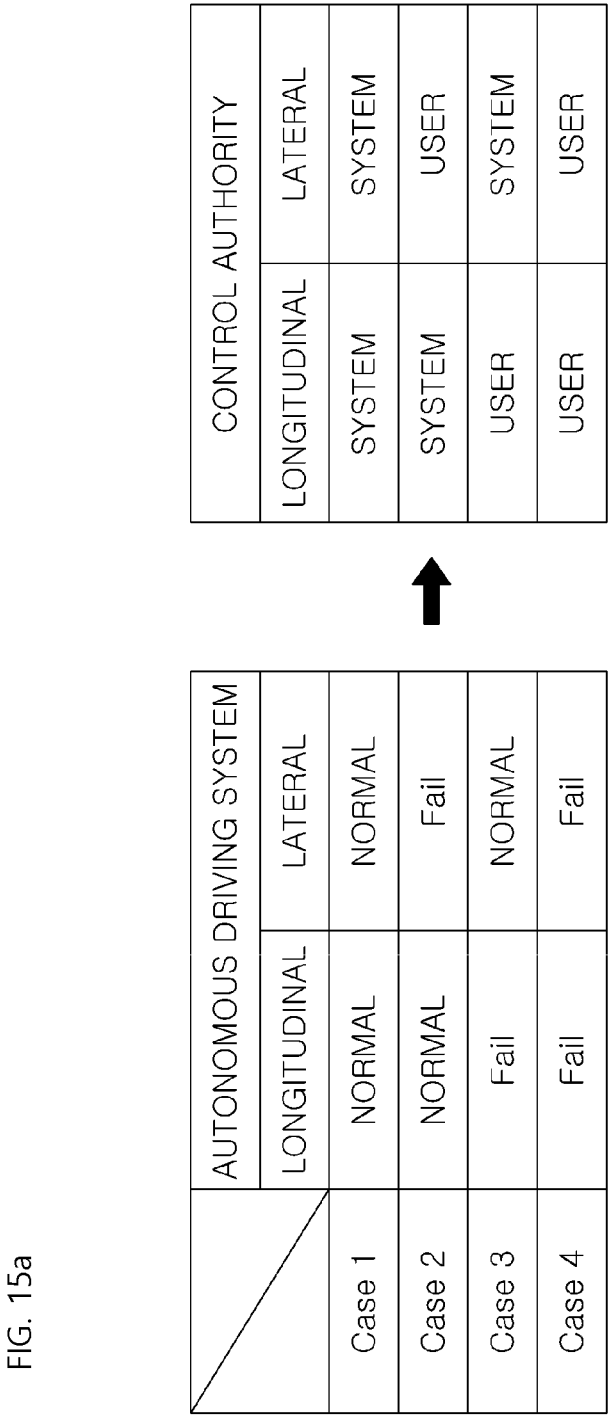

As illustrated in FIG. 15a, when both the longitudinal direction control and the lateral direction control are normal during the autonomous driving control, the autonomous driving system has control authority (case 1). When the longitudinal direction control is normal but the lateral direction control fails during the autonomous driving control, the autonomous driving system has control authority for the longitudinal direction control, and the selected user has control authority for the lateral direction control (case 2). When the longitudinal direction control fails but the lateral direction control is normal during the autonomous driving control, the selected user has control authority for the longitudinal direction control, and the autonomous driving system has control authority for the lateral direction control (case 3). When both the longitudinal direction control and the lateral direction control fail during the autonomous driving control, the selected user has control authority (case 4).

Figure 15B:
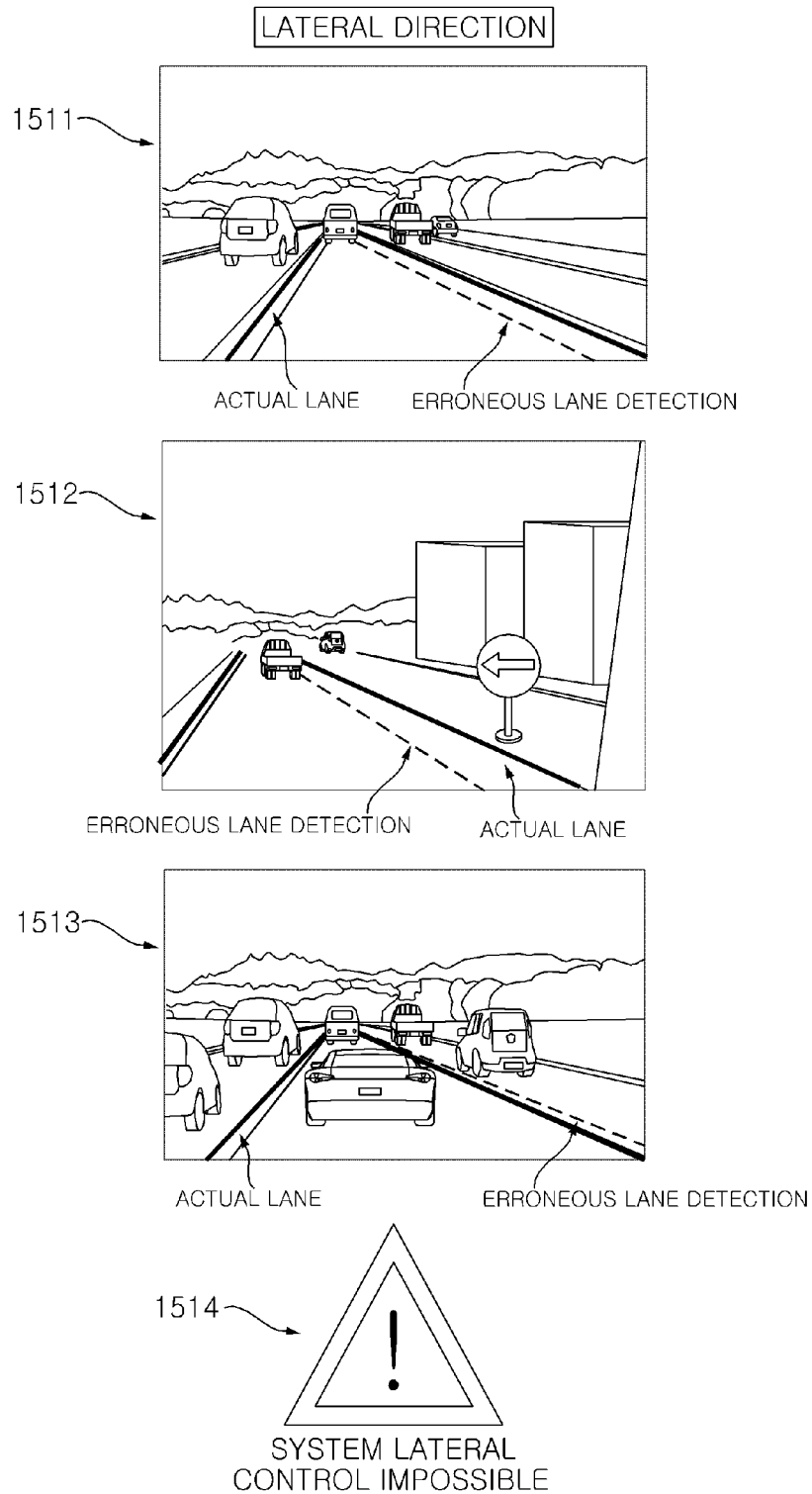

As illustrated in FIG. 15b, when an error occurs in lane detection, lateral direction control may fail. For example, an error may occur in lane detection due to failure or performance deterioration of a lane detection sensor (e.g. a camera) (1511). For example, in the case in which a temporary lane is drawn in a construction section in addition to the lane drawn on the road surface, an error may occur in lane detection (S1512). For example, an error may occur in lane detection due to weather conditions (snow, rain, or fog) (S1513). When the lateral direction control fails, the user interface device 200 may output lateral direction control failure status information (1514).

Figure 15C:
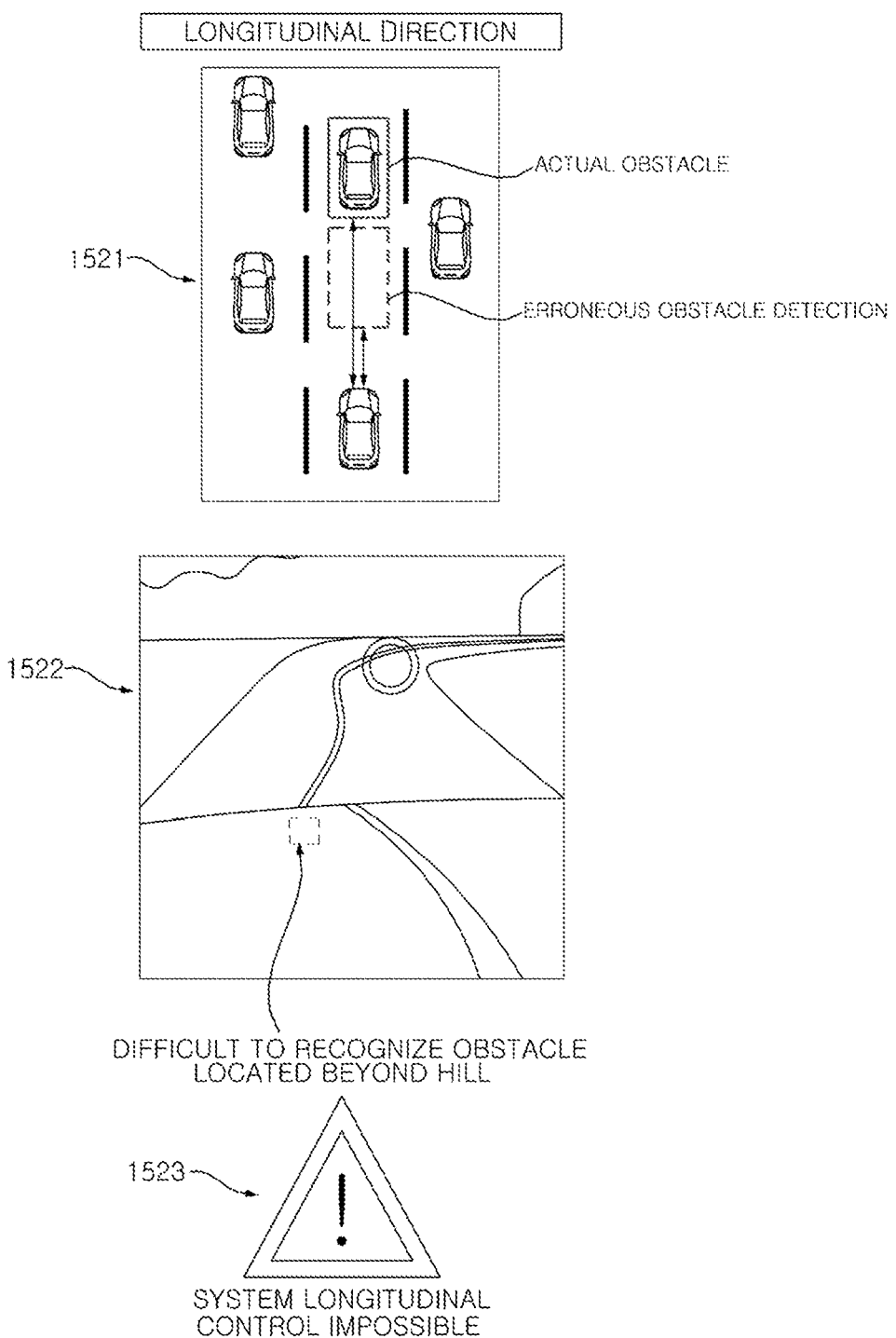

As illustrated in FIG. 15c, when an error occurs in detecting objects ahead of the vehicle, longitudinal direction control may fail. For example, an error may occur in detecting forward objects due to failure or performance deterioration of an object detection sensor (e.g. a camera, a radar, a lidar, or an ultrasonic sensor) (1521). For example, in the case in which a slope is located ahead of the vehicle, an error may occur in detecting forward objects (1522). When the longitudinal direction control fails, the user interface device 200 may output longitudinal direction control failure status information (1523).

Figure 15D:
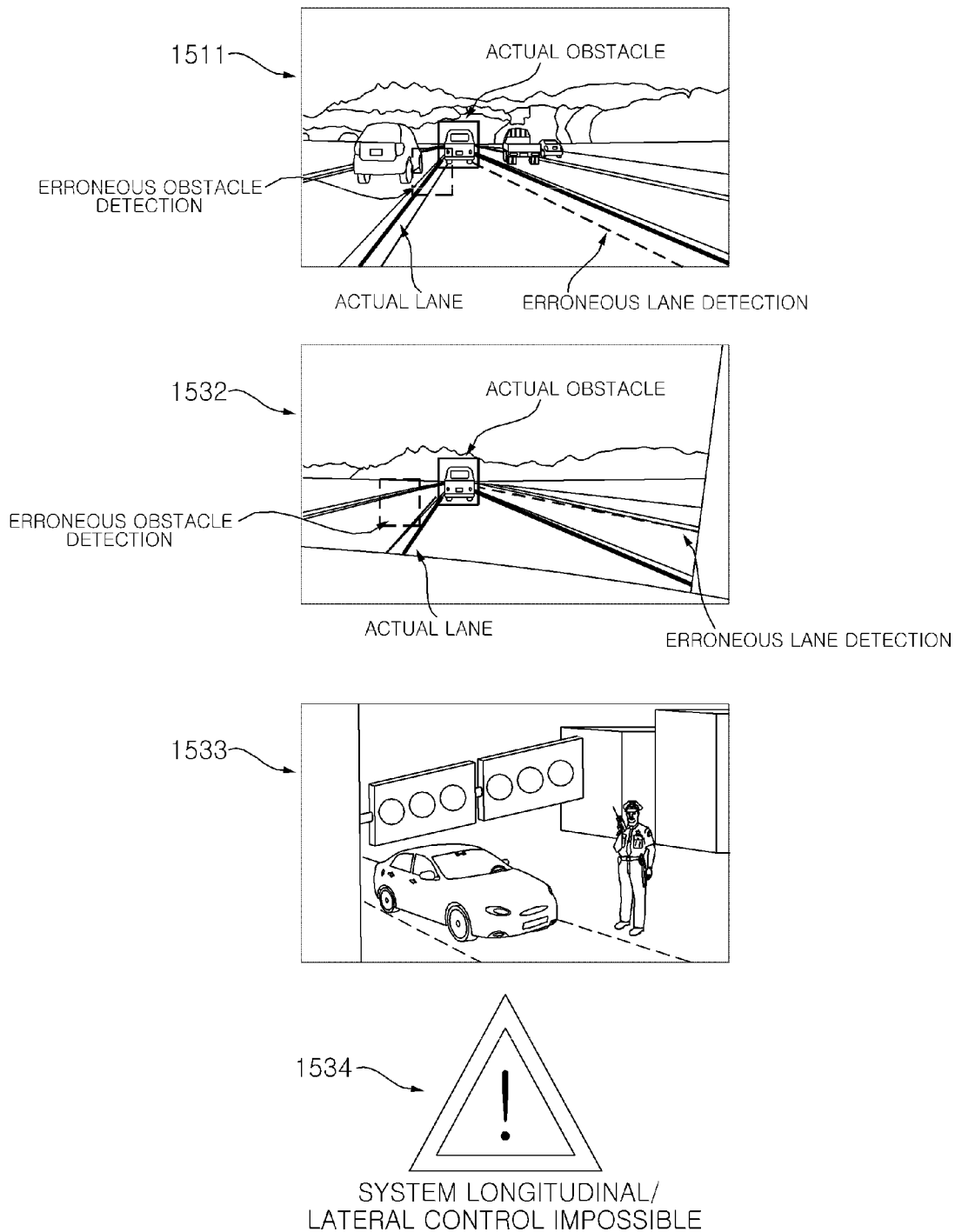

As illustrated in FIG. 15d, when an error occurs in detecting lanes and objects ahead of the vehicle, the lateral direction control and the longitudinal direction control may fail. For example, an error may occur in detecting lanes and objects due to failure or performance deterioration of a lane detection sensor and an object detection sensor (1531). For example, an error may occur in detecting lanes and objects due to weather conditions (heavy rain, heavy snow, or dense fog) (1532). For example, in the case in which a traffic light is broken, it is impossible to acquire signal information about straight movement, stop, left turn, or right turn at an intersection, and thus the lateral direction control and the longitudinal direction control may fail. When the lateral direction control and the longitudinal direction control fail, the user interface device 200 may output lateral direction control and longitudinal direction control failure status information (1534).

Figure 16:
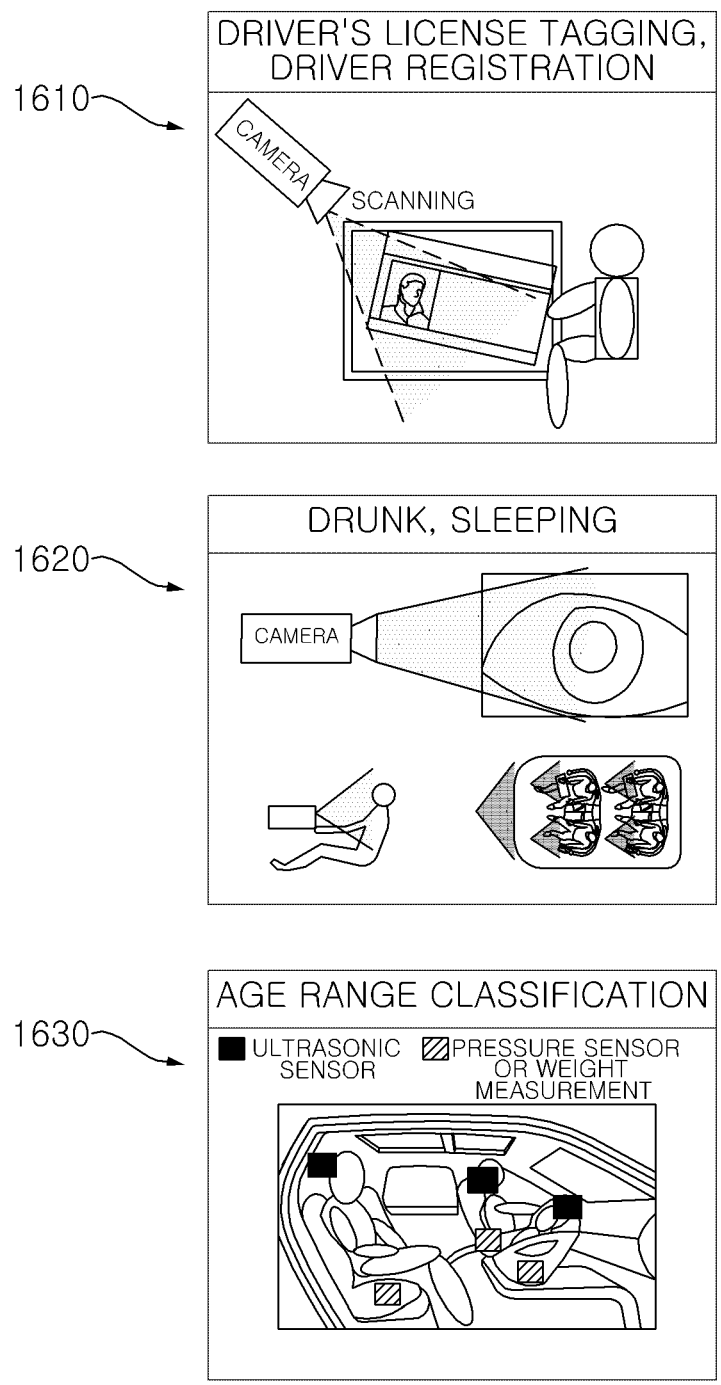

FIG. 16 illustrates the operation of acquiring user data.

The internal camera 220 may capture an image of the driver's license of the user (1610). The processor 270 may acquire user data based on the driver's license of the user photographed by the internal camera 220. The input unit 210 may receive user input. The processor 270 may acquire user data based on the user input.

At least one of the internal camera 220 or the biometric sensing unit 230 may sense the state of the user. For example, the internal camera 220 and the biometric sensing unit 230 may sense whether the user is in a drunk state or in a sleeping state.

The biometric sensing unit 230 may provide age range information of the user based on biometric information of the user. The vehicle 100 may include a weight sensor provided in the seat. The weight sensor may provide weight information of the user, and the processor 270 may generate age range information based on the weight information.

Figure 17:
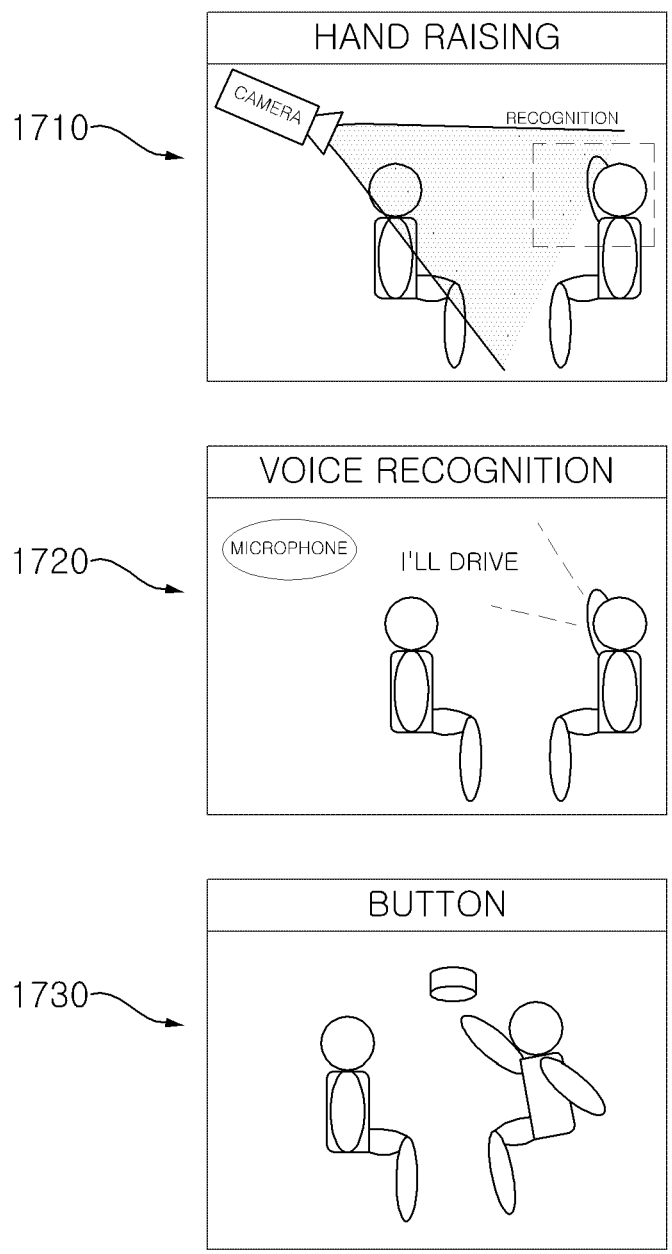
Figure 18:
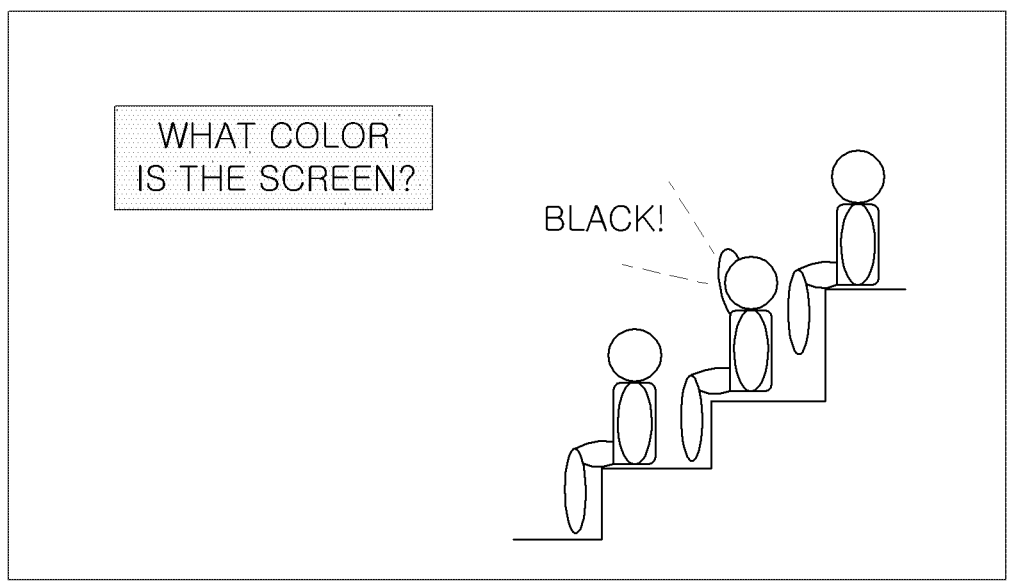

FIGS. 17 and 18 illustrate the operation of selecting a driving operation user.

In addition to the above-described method of selecting a user based on the driving operation priorities, a method of selecting a user according to volunteering of the user, which is illustrated in FIG. 17, or a method of selecting a user according to a test result, which is illustrated in FIG. 18, may be used.

As illustrated in FIG. 17, the internal camera 310 may sense the gesture of a user who desires to be selected as a driving operation user. The processor 270 may select a user whose gesture is sensed among the plurality of users as a driving operation user (1710). The voice input unit 211 may sense user voice input. The processor 270 may select a user whose voice input is sensed among the plurality of users as a driving operation user (1720). The touch input unit 213 or the mechanical input unit 214 may sense user button input. The processor 270 may select a user who presses a button among the plurality of users as a driving operation user (1730).

As illustrated in FIG. 18, the processor 270 may output test contents through the output unit 250, and may acquire the test result of a specific user through the input unit 210. The processor 270 may select a driving operation user based on the acquired test result.

Figure 19:
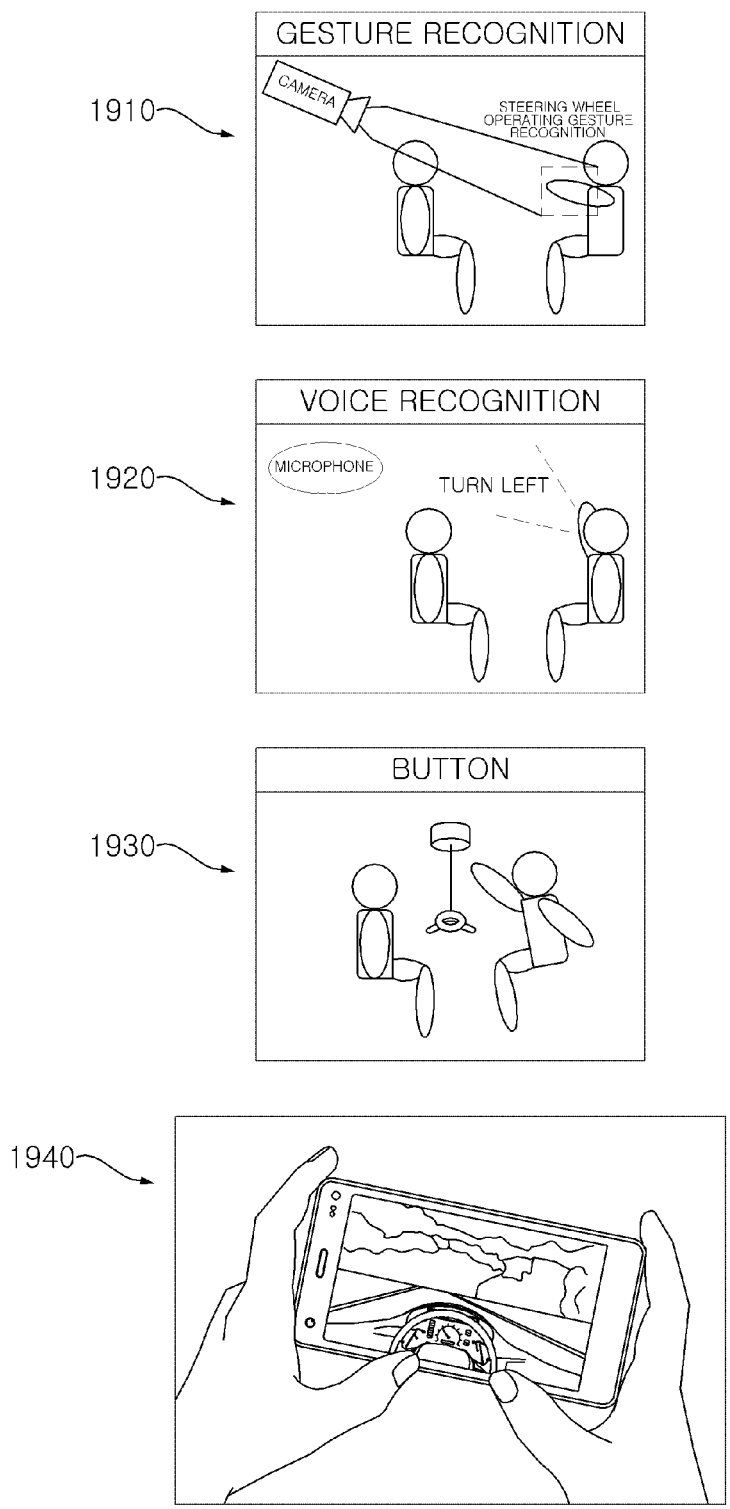

FIG. 19 is a view for explaining a device selected as a driving operation device.

As illustrated in FIG. 19, the processor 270 may select the internal camera 220 or the gesture input unit 212 as a driving operation device (1910). The internal camera 220 or the gesture input unit 212 may convert user gesture input into a driving operation signal.

The processor 270 may select the voice input unit 211 as a driving operation device (1920). The voice input unit 211 may convert user voice input into a driving operation signal.

The vehicle 100 may include a separate operation device (1930). The operation device may be hidden during autonomous driving. When the sub-user is selected, the operation device may be provided to the selected sub-user. For example, the operation device may drop from the ceiling to be provided to the selected sub-user. The operation device may include a display for outputting streaming data and vehicle information. The operation device may convert user input into a driving operation signal.

The processor 270 may select a display device provided in the vehicle or a mobile terminal as a driving operation device (1940). The display device or the mobile terminal may convert user touch input into a driving operation signal.

Figure 20A:
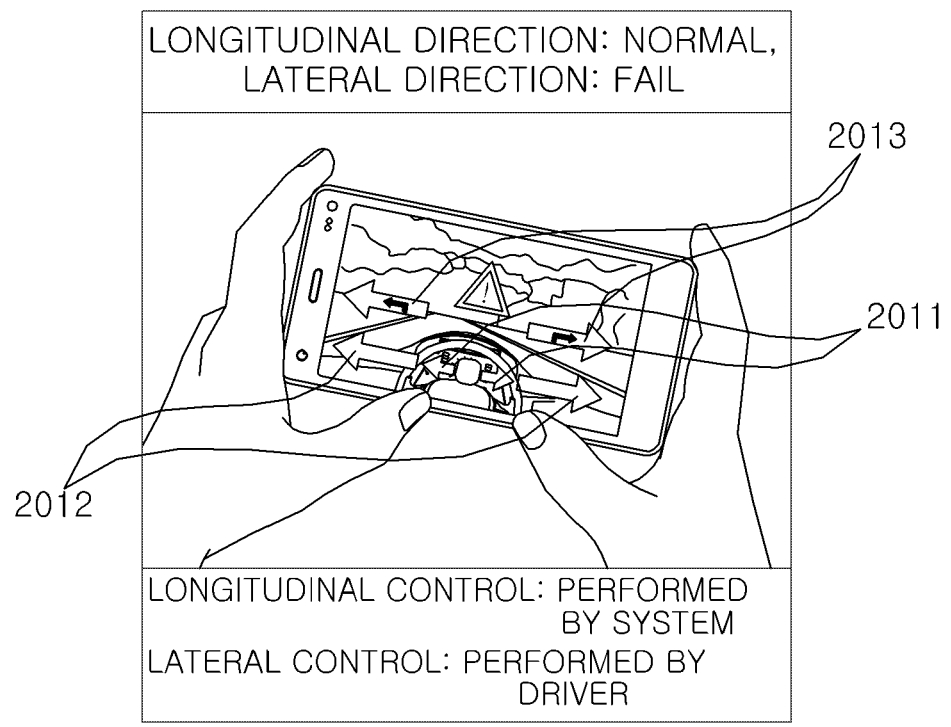
Figure 20B:
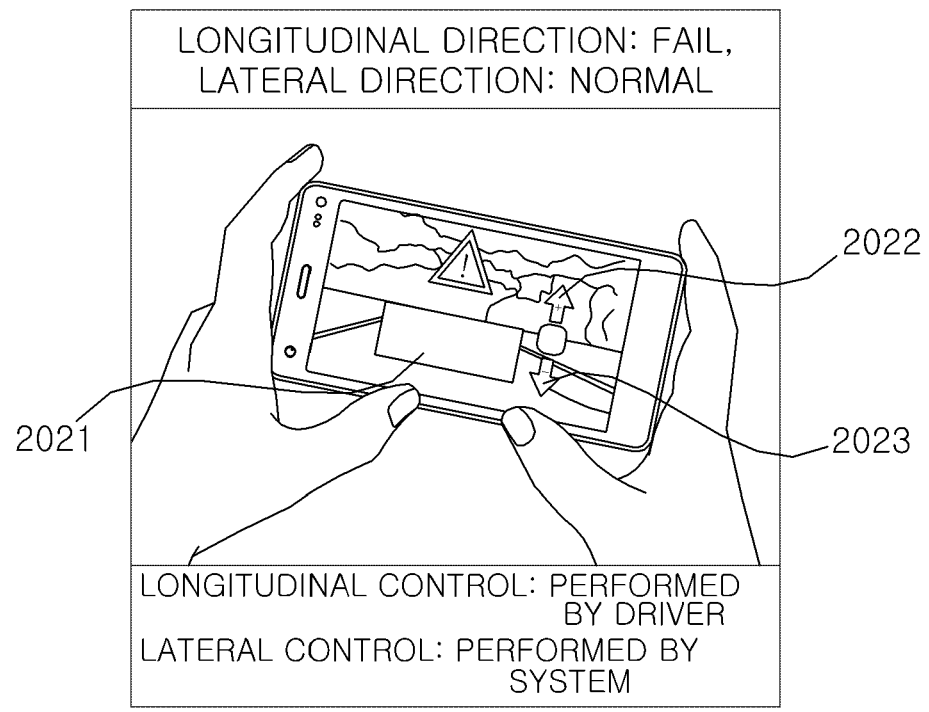
Figure 20C:
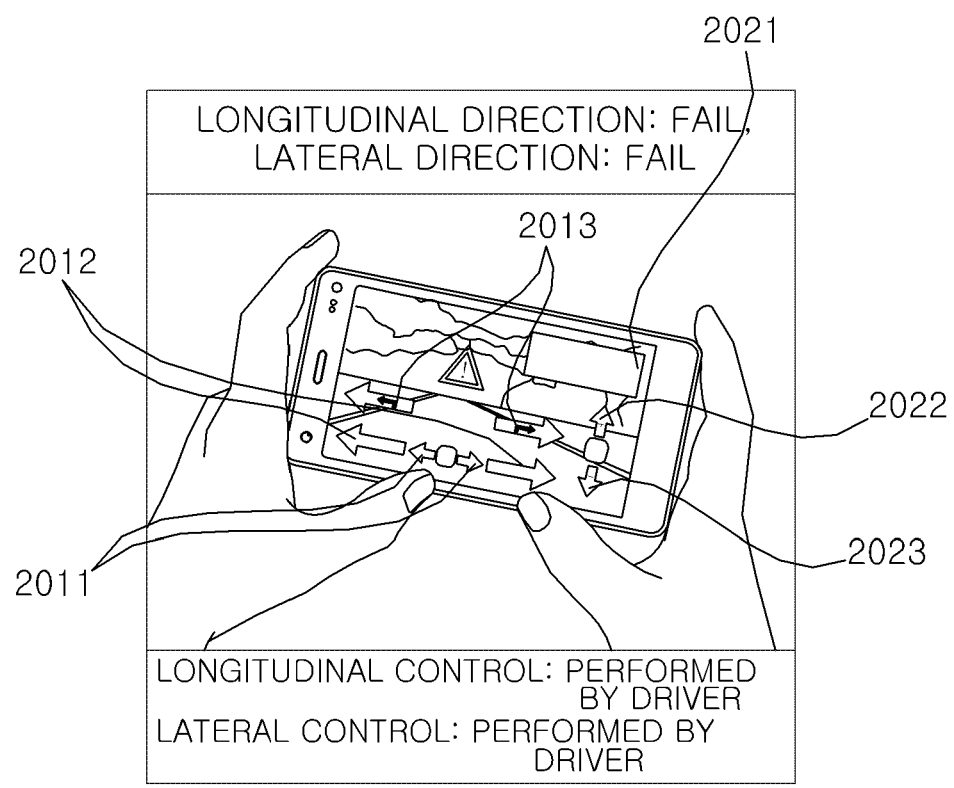

FIGS. 20a to 20c are views for explaining driving control using a device selected as a driving operation device. In the drawings, a mobile terminal is illustrated by way of example. However, when the driving operation device is a display device, the description of the mobile terminal may also be applied thereto.

FIG. 20a illustrates a driving operation screen displayed on the driving operation device when the lateral direction control fails. The driving operation device (e.g. the mobile terminal or the display device) may display a driving operation screen based on the signal received from the control authority transfer apparatus 200. The driving operation screen may include at least one soft button for generating a steering control signal. For example, the driving operation screen may include a button 2011 for generating a signal, based on which steering control is performed such that the vehicle 100 travels within the current travel lane. For example, the driving operation screen may include a button 2012 for generating a signal, based on which steering control is performed such that the vehicle 100 moves from the current travel lane to another lane. For example, the driving operation screen may include a button 2013 for generating a signal, based on which steering control is performed such that the vehicle 100 turns right or left.

FIG. 20b illustrates a driving operation screen displayed on the driving operation device when the longitudinal direction control fails. The driving operation device may display a driving operation screen based on the signal received from the control authority transfer apparatus 200. The driving operation screen may include an area 2021 displaying a driving speed value. The driving operation device may display information about the current driving speed and an allowable speed range through the area 2021 displaying a driving speed value. The driving operation screen may include at least one soft button for generating acceleration/deceleration signals. For example, the driving operation screen may include a button 2022 for increasing the driving speed value in stages within a range below a preset speed limit value. When the button 2022 receives touch input, the driving operation device may generate a signal for performing acceleration control. For example, the driving operation screen may include a button 2023 for decreasing the driving speed value in stages. When the button 2023 receives touch input, the driving operation device may generate a signal for performing deceleration control.

FIG. 20c illustrates a driving operation screen displayed on the driving operation device when the lateral direction control and the longitudinal direction control fail. The driving operation device (e.g. the mobile terminal or the display device) may display a driving operation screen based on the signal received from the control authority transfer apparatus 200. The driving operation screen may include at least one soft button for generating a steering control signal. The driving operation screen may include an area 2021 displaying a driving speed value. The driving operation screen may include at least one soft button for generating acceleration/deceleration signals. The detailed description made with reference to FIGS. 20a and 20b may be applied to the driving operation screen.

Figure 21:
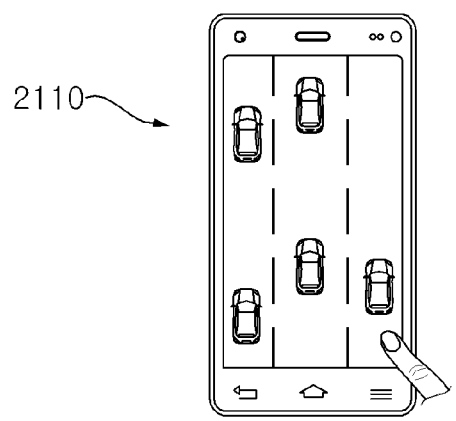
Figure 21:
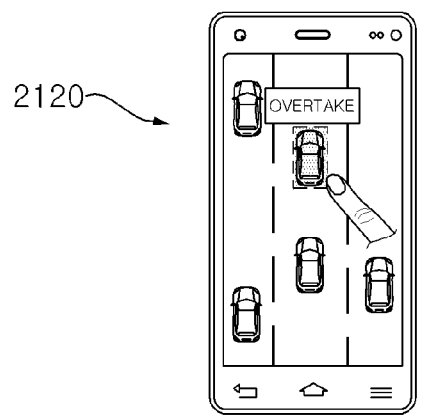
Figure 21:
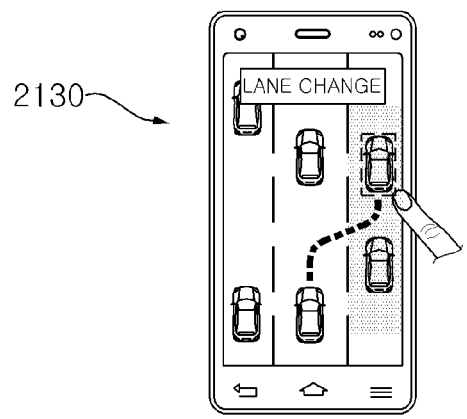

FIG. 21 shows an example of the driving operation screen.

The driving operation screen may display the driving state of the vehicle 100 in a top view (2110). In the state in which the driving state screen is displayed in a top view, when user touch input with respect to another vehicle preceding the vehicle 100 is received (2120), the driving operation device may generate a driving operation signal for overtaking the other vehicle. The vehicle 100 may overtake the other vehicle based on the generated signal. In the state in which the driving state screen is displayed in a top view, when swipe input in the direction from the current travel lane to an adjacent lane is received (2130), the driving operation device may generate a driving operation signal for changing lanes. The vehicle 100 may change lanes based on the generated signal.

Figure 22:
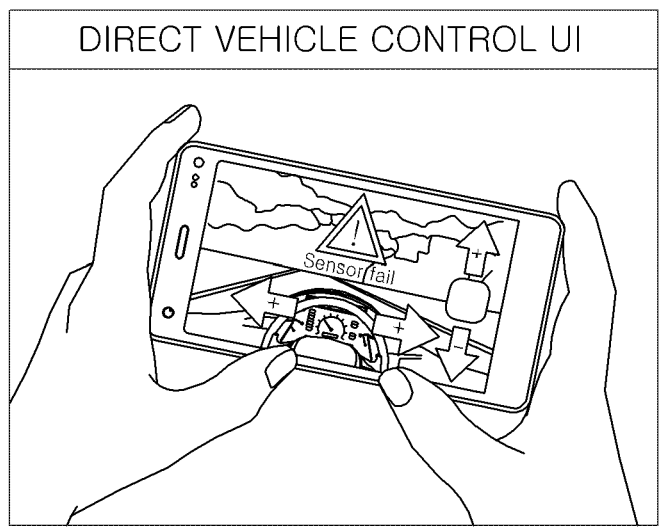

FIG. 22 shows an example of the driving operation screen.

The driving operation screen may include a soft button for steering operation and a soft button for acceleration/deceleration operation. In some embodiments, the buttons may be "+/−" buttons. In some embodiments, the buttons may be formed in the shape of a steering wheel, an accelerator pedal, and a brake pedal. When the steering operation button or the acceleration/deceleration operation button receives touch input, the driving operation device may generate a control signal corresponding to the touched button.

The aforementioned present invention may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), Read-Only Memory (ROM), Random-Access Memory (RAM), CD-ROM, magnetic tapes, floppy disks, optical data storage devices, carrier waves (e.g. transmission via the Internet), etc. In addition, the computer may include a processor and a controller. The above embodiments are therefore to be construed in all aspects as illustrative and not restrictive. It is intended that the present invention cover the modifications and variations of this invention provided they come within the scope of the appended claims and their equivalents.

DESCRIPTION OF REFERENCE NUMERALS

100: vehicle

The invention claimed is:

1. A control authority transfer apparatus of an autonomous vehicle, comprising:
    a memory storing data regarding a plurality of users; and
    at least one processor configured to:
    set driving operation priorities based on the data,
    based on (i) a determination that at least a part of autonomous driving control has failed and (ii) a determination that a main user is incapable of performing a driving operation:
        select a first sub-user among a plurality of sub-users as a driving operation user according to the driving operation priorities, and
        select a first device matching the first sub-user as a driving operation device,
    wherein the first device is a display device, and
    wherein the processor is configured to:
        based on a determination that lateral direction control has failed during autonomous driving control, control the display device to display a driving operation screen comprising at least one button for lateral-direction movement, or
        based on a determination that longitudinal direction control has failed during autonomous driving control, control the display device to display a driving operation screen comprising at least one button for longitudinal-direction movement.

2. The control authority transfer apparatus of claim 1, wherein the processor is configured to set the driving operation priorities based on at least one of driving experience data, accident history data, age data, seating position data, or driving history data of each of the plurality of users.

3. The control authority transfer apparatus of claim 1, wherein the processor is configured to:
    based on the determination that the lateral direction control has failed during the autonomous driving control, control the display device to display the driving operation screen comprising a button for lateral-direction movement within a lane, a button for lateral-direction movement for changing lanes, and a button for lateral-direction movement for rotation.

4. The control authority transfer apparatus of claim 1, wherein the processor is configured to:
    based on the determination that the longitudinal direction control has failed during the autonomous driving control, control the display device to display the driving operation screen comprising an area displaying a driving speed value, a button increasing the driving speed value in stages within a range below a preset speed limit value, and a button decreasing the driving speed value in stages.

5. The control authority transfer apparatus of claim 1, wherein the processor is configured to, based on a determination that the main user is capable of performing the driving operation, select a second device matching the main user as a driving operation device.

6. A control authority transfer method of an autonomous vehicle, comprising:
    storing, by at least one processor, data regarding a plurality of users in a memory;
    setting, by the at least one processor, driving operation priorities based on the data;
    determining, by the at least one processor, whether a main user is capable of performing driving operation based on a determination that at least a part of autonomous driving control has failed;

based on a determination that the main user is incapable of performing a driving operation, selecting, by the at least one processor, a first sub-user among a plurality of sub-users as a driving operation user according to the driving operation priorities; and selecting, by the at least one processor, a first device matching the first sub-user as a driving operation device, wherein the first device is a display device, wherein determining whether the main user is capable of performing the driving operation comprises determining that lateral direction control or longitudinal direction control has failed during autonomous driving control, and wherein selecting the first device as the driving operation device comprises:

controlling, based on a determination that lateral direction control has failed during autonomous driving control, the display device to display a driving operation screen comprising at least one button for lateral-direction movement, or controlling, based on a determination that longitudinal direction control has failed during autonomous driving control, the display device to display a driving operation screen comprising at least one button for longitudinal-direction movement.

7. The control authority transfer method of claim 6, wherein setting the driving operation priorities comprises setting, by the at least one processor, the driving operation priorities based on at least one of driving experience data, accident history data, age data, seating position data, or driving history data of each of the plurality of users.

8. The control authority transfer method of claim 6, wherein determining whether the main user is capable of performing the driving operation comprises determining that lateral direction control has failed during autonomous driving control, and wherein selecting the first device as the driving operation device comprises controlling the display device to display the driving operation screen comprising a button for lateral-direction movement within a lane, a button for lateral-direction movement for changing lanes, and a button for lateral-direction movement for rotation.

9. The control authority transfer method of claim 6, wherein determining whether the main user is capable of performing the driving operation comprises determining that longitudinal direction control has failed during autonomous driving control, and wherein selecting the first device as the driving operation device comprises controlling the display device to display the driving operation screen comprising an area displaying a driving speed value, a button increasing the driving speed value in stages within a range below a preset speed limit value, and a button decreasing the driving speed value in stages.

10. The control authority transfer method of claim 6, further comprising:

based on a determination that the main user is capable of performing the driving operation, selecting a second device matching the main user as a driving operation device.

* * * * *